United States Patent
Ben-Kiki et al.

(10) Patent No.: US 9,747,108 B2
(45) Date of Patent: Aug. 29, 2017

(54) USER-LEVEL FORK AND JOIN PROCESSORS, METHODS, SYSTEMS, AND INSTRUCTIONS

(71) Applicant: INTEL CORPORATION, Santa Clara, CA (US)

(72) Inventors: Oren Ben-Kiki, Tel-Aviv (IL); Ilan Pardo, Ramat-Hasharon (IL); Arch D. Robison, Champaign, IL (US); James H. Cownie, Bristol (GB)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 14/671,475

(22) Filed: Mar. 27, 2015

(65) Prior Publication Data
US 2016/0283245 A1    Sep. 29, 2016

(51) Int. Cl.
  *G06F 12/10*    (2016.01)
  *G06F 9/38*    (2006.01)
  *G06F 12/0875*    (2016.01)
  *G06F 12/0811*    (2016.01)
  *G06F 9/30*    (2006.01)

(52) U.S. Cl.
  CPC .......... *G06F 9/3822* (2013.01); *G06F 9/3009* (2013.01); *G06F 9/3806* (2013.01); *G06F 9/3877* (2013.01); *G06F 12/0811* (2013.01); *G06F 12/0875* (2013.01); *G06F 2212/283* (2013.01); *G06F 2212/452* (2013.01)

(58) Field of Classification Search
  CPC . G06F 9/3822; G06F 12/0875; G06F 12/0811
  See application file for complete search history.

(56) References Cited

U.S. PATENT DOCUMENTS

| 5,499,349 | A | * | 3/1996 | Nikhil | ................... | G06F 9/4436 |
| | | | | | | 712/201 |
| 6,687,812 | B1 | | 2/2004 | Shimada | | |
| 8,010,969 | B2 | | 8/2011 | Hankins et al. | | |
| 2003/0014473 | A1 | * | 1/2003 | Ohsawa | ................ | G06F 9/3009 |
| | | | | | | 718/107 |

(Continued)

OTHER PUBLICATIONS

International Search Report and Written Opinion received for PCT Patent Application No. PCT/US2016/016700 , mailed on May 24, 2016, 16 pages.

(Continued)

*Primary Examiner* — Jae Yu
(74) *Attorney, Agent, or Firm* — Vecchia Patent Agent, LLC

(57) ABSTRACT

A processor of an aspect includes a plurality of processor elements, and a first processor element. The first processor element may perform a user-level fork instruction of a software thread. The first processor element may include a decoder to decode the user-level fork instruction. The user-level fork instruction is to indicate at least one instruction address. The first processor element may also include a user-level thread fork module. The user-level fork module, in response to the user-level fork instruction being decoded, may configure each of the plurality of processor elements to perform instructions in parallel. Other processors, methods, systems, and instructions are disclosed.

28 Claims, 16 Drawing Sheets

(56) References Cited

U.S. PATENT DOCUMENTS

| | | | |
|---|---|---|---|
| 2007/0006231 A1* | 1/2007 | Wang | G06F 9/30003 |
| | | | 718/100 |
| 2008/0104485 A1 | 5/2008 | Lyakh et al. | |
| 2010/0115243 A1 | 5/2010 | Kissell | |
| 2014/0089635 A1 | 3/2014 | Shifer et al. | |
| 2014/0189300 A1 | 7/2014 | Pardo et al. | |
| 2014/0189317 A1 | 7/2014 | Ben-Kiki et al. | |
| 2014/0189332 A1 | 7/2014 | Ben-Kiki et al. | |
| 2014/0189333 A1 | 7/2014 | Ben-Kiki et al. | |
| 2014/0189426 A1 | 7/2014 | Ben-Kiki et al. | |
| 2014/0189713 A1 | 7/2014 | Ben-Kiki et al. | |
| 2015/0007196 A1 | 1/2015 | Toll | |

OTHER PUBLICATIONS

Robison, Arch, "A Primer on Scheduling Fork-Join Parallelism with Work Stealing", published on Jan 15, 2015, 6 pages.
Intel, "Intel Architecture Software Developer's Manual", vol. 2, Instruction Set Reference,1999, 28 pages.
Office Action received for Taiwan Patent Application No. 105105508, dated Feb. 17, 2017, 8 pages of English Translation and 8 pages of Taiwan Office Action.

* cited by examiner

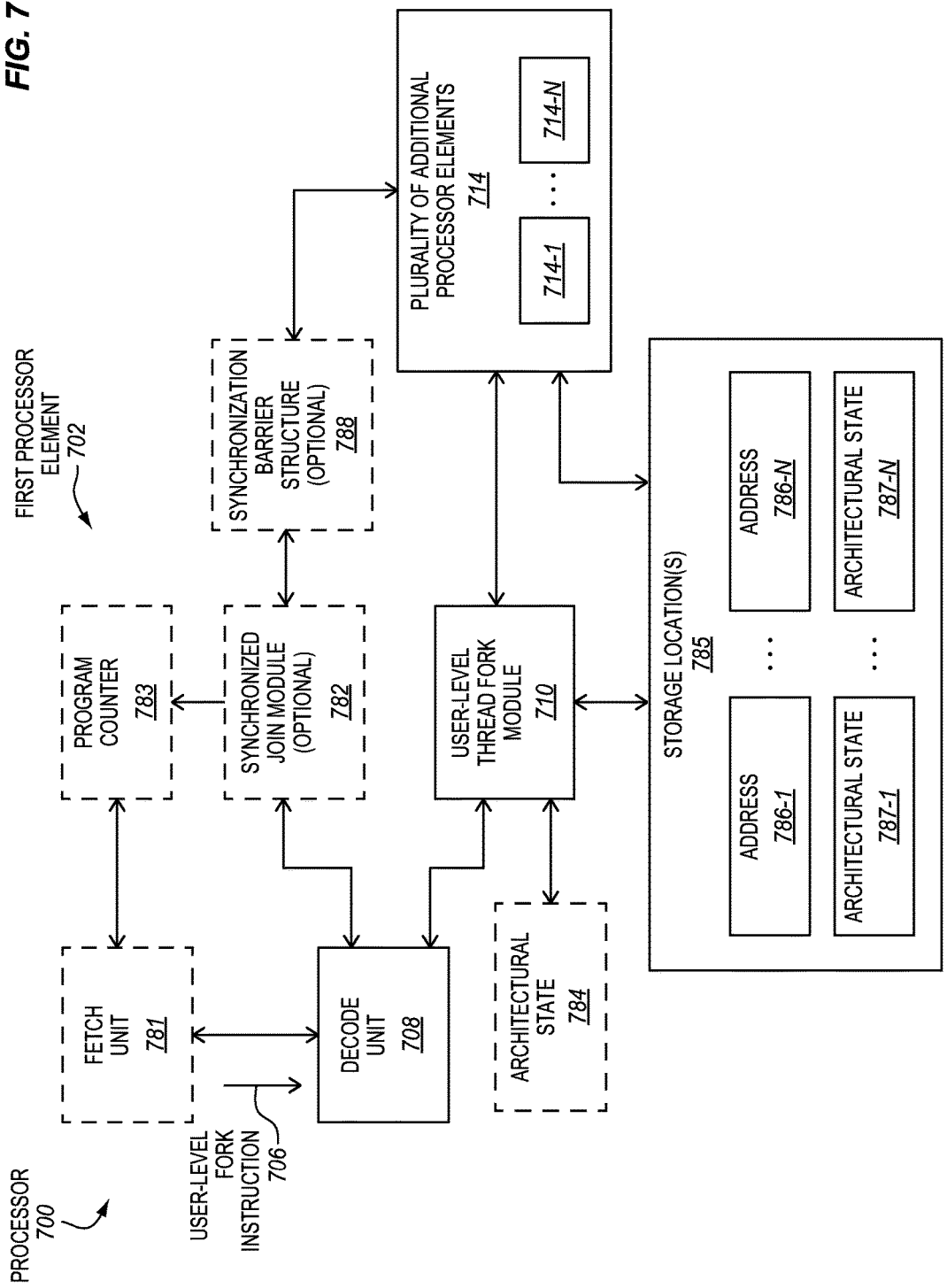

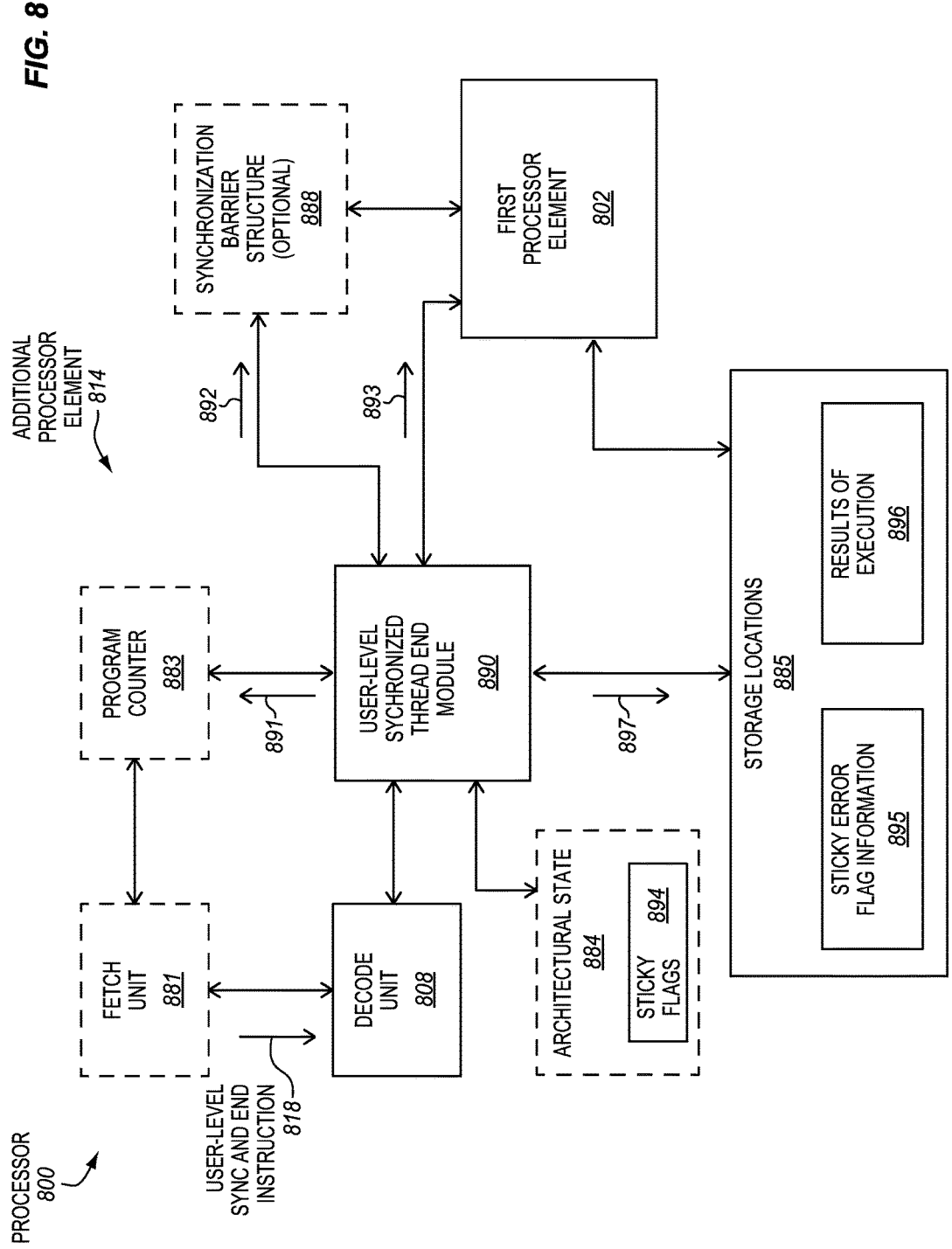

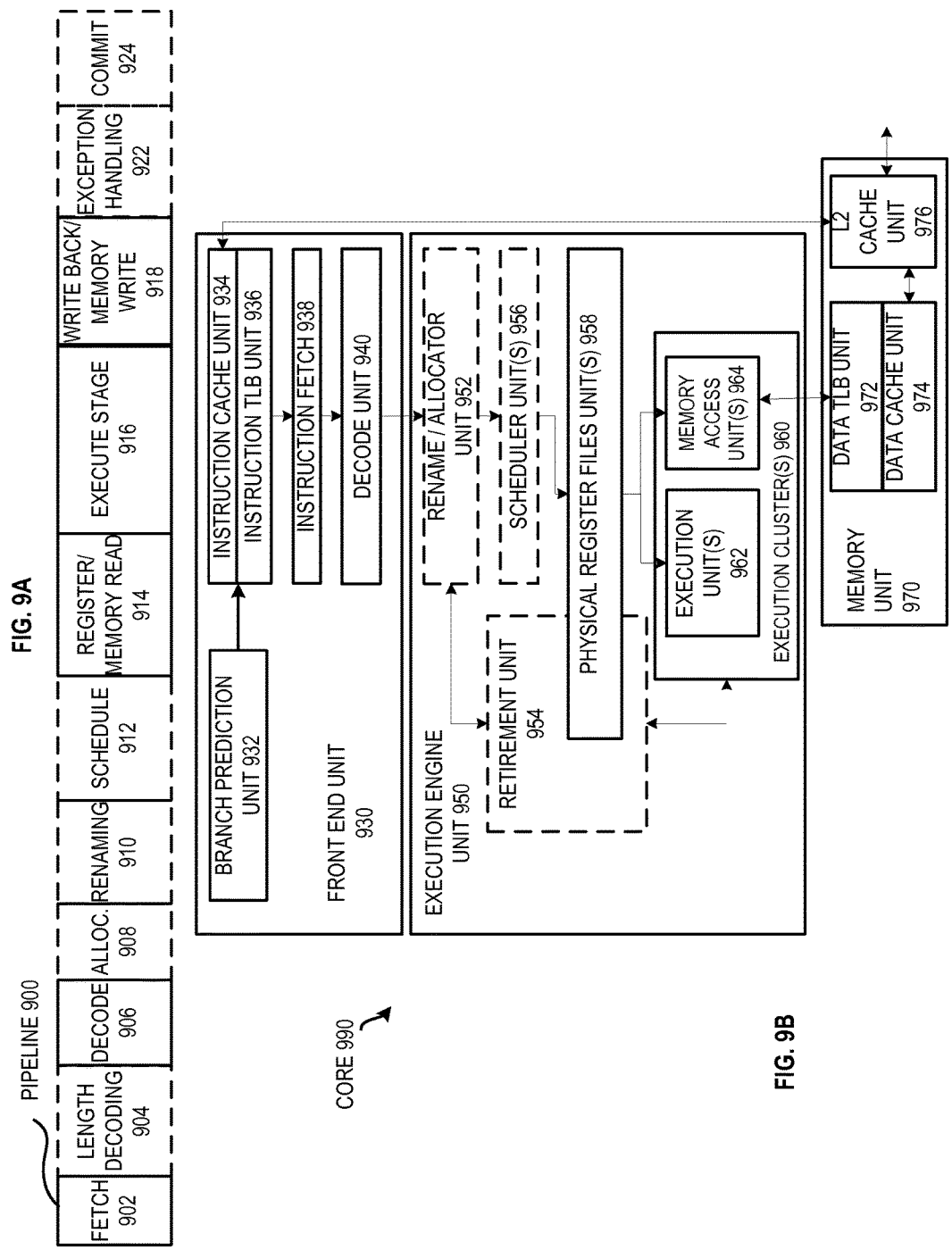

US 9,747,108 B2

USER-LEVEL FORK AND JOIN PROCESSORS, METHODS, SYSTEMS, AND INSTRUCTIONS

BACKGROUND

Technical Field

Embodiments described herein generally relate to processors. In particular, embodiments described herein generally relate to parallel processing in processors.

Background Information

One technique that has been used to improve performance in computer systems and other electronic devices having one or more processors is parallel processing. Parallel processing generally refers to the simultaneous use of more than one hardware thread, core, central processing unit, processor, or other processor element to perform a program or multiple threads. Parallel processing may help to allow programs to run faster because there are more such processor elements running it in parallel.

BRIEF DESCRIPTION OF THE DRAWINGS

The invention may best be understood by referring to the following description and accompanying drawings that are used to illustrate embodiments. In the drawings:

FIG. 7 is a block diagram of an example embodiment of a processor to perform an embodiment of a user-level fork instruction.

FIG. 8 is a block diagram of an example embodiment of a processor to perform an embodiment of a user-level synchronize and end instruction.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

DETAILED DESCRIPTION OF EMBODIMENTS

Disclosed herein are user-level fork instructions (e.g., user-level fork, user-level fork and synchronized join instructions), user-level synchronize and end instructions, user-level synchronize and end instructions, processors to execute or perform the instructions, methods performed by the processors when executing or performing the instructions, and systems incorporating one or more processors to execute or perform the instructions. In the following description, numerous specific details are set forth (e.g., specific instruction operations, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
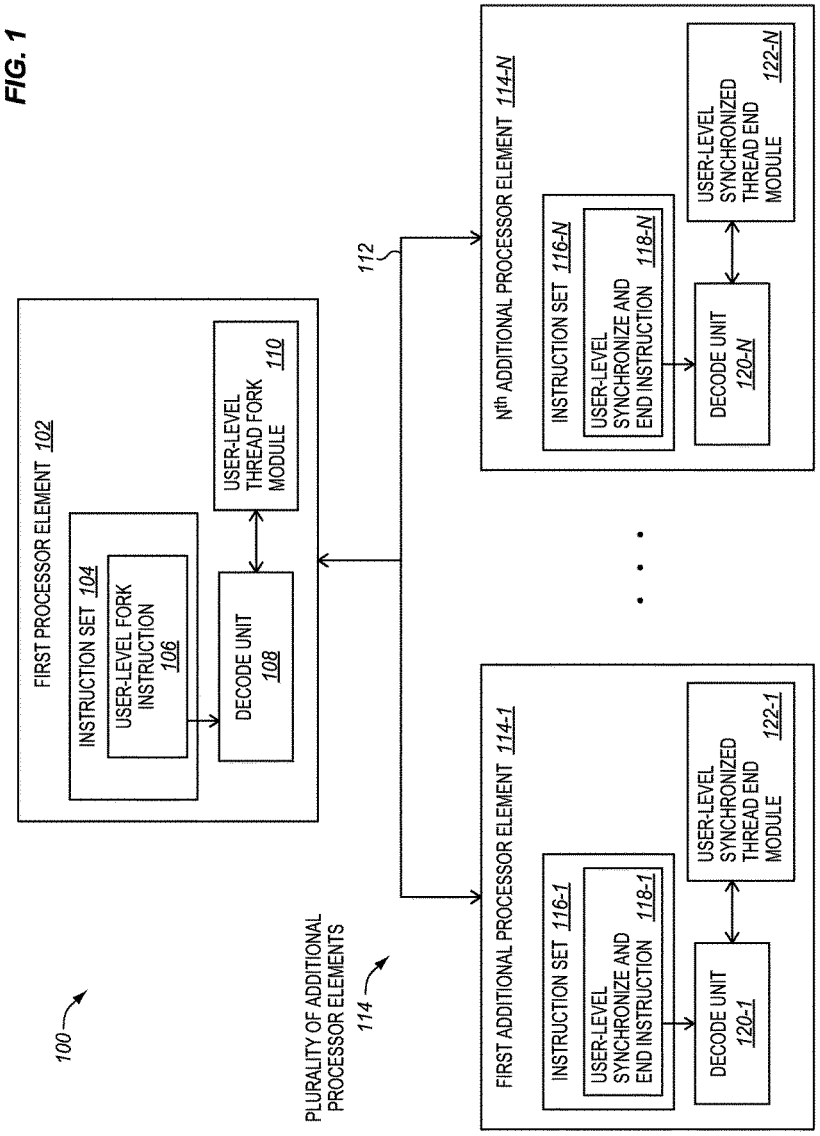
FIG. 1 is a block diagram of an embodiment of a processor.

FIG. 1 is a block diagram of an embodiment of a processor 100. In some embodiments, the processor may be a general-purpose processor (e.g., a general-purpose microprocessor or central processing unit (CPU) of the type used in desktop, laptop, smart phone, or other computers). Alternatively, the processor may be a special-purpose processor. Examples of suitable special-purpose processors include, but are not limited to, graphics processors, co-processors, network processors, communications processors, cryptographic processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures.

The processor has a first processor element 102 and a plurality of additional processor elements 114. The first processor element and the additional processor elements may be connected or otherwise coupled together by one or more busses or other interconnects 112 (e.g., one or more rings, torus, meshes, etc.). As shown, the plurality of additional processor elements may include a first additional processor element 114-1 through an Nth additional processor element 114-N. The number of additional processor elements may represent any desired number that is appropriate for the particular implementation. By way of example, the number of additional processor elements may range from two to on the order of several hundred, or in some cases from ten to about two hundred, or in some cases from twenty to about two hundred, or in some cases more than ten, twenty, or thirty, although the scope of the invention is not so limited. As one example, there may be from about forty to about two hundred, although this is not required. In some embodiments, the first processor element 102 and each of the additional processor elements 114, may all be disposed on a single integrated circuit die or other semiconductor substrate. Alternatively, some or all of the additional processor elements 106 may optionally be disposed on a different die or other semiconductor substrate than the first processor element, and optionally be included in a same integrated circuit package as the first processor element. In some embodiments, the additional processor elements 114 may not represent graphics cards, GPGPUs, or other such separate devices that can generally only be accessed through a driver, middleware, or the like.

Examples of suitable processor elements for the first processor element 102 and each of the additional processor elements 114 include, but are not limited to, cores, hardware threads, thread units, thread slots, logic operative to store a context or architectural state and a program counter (also referred to in the art as an instruction pointer), logic that is operative to store state and be independently associated with code, and other logical processors. The term core is often used to refer to logic located on an integrated circuit that is capable of maintaining an independent architectural state (e.g., an execution state), and in which the architectural state is associated with dedicated execution and certain other resources. In contrast, the term hardware thread is often used to refer to logic located on an integrated circuit that is capable of maintaining an independent architectural state, and in which the architectural state shares access to execution or certain other resources. When some execution or certain other resources are shared for two or more architectural states, and other execution or certain other resources are dedicated to an architectural state, the line between such usage of the terms core and hardware thread may is less distinct. Nevertheless, the cores, hardware threads, and other processor elements are often viewed by software as individual logical processors or processor elements. Generally, threads, processors, or workloads may be scheduled on, and independently associated with, each of the cores, hardware threads, or other processor elements.

The first processor element 102 has an instruction set 104. Each of the plurality of additional processor elements 114 also has a corresponding instruction set 116. The instruction set 104 of the first processor element may either be the same as, or may be different than (e.g., may have some overlapping instructions and some non-overlapping instructions), the instruction sets 116 of each of the additional processor elements. The instruction sets are part of the instruction set architectures (ISAs) of the respective processor elements and include the native instructions that the processor elements are operative to perform. The instructions of the instruction sets may represent macroinstructions, machine-level instructions, or assembly language instructions.

The instruction set 104 of the first processor element includes a user-level fork instruction 106. In some embodiments, the user-level fork instruction 106 may omit synchronize and join functionality (e.g., synchronize and join functionality may be provided by a separate user-level synchronize and join instruction or multiple other instructions to implement such functionality). In other embodiments the instruction 106 may be a user-level fork and synchronized join instruction which incorporates synchronize and join functionality. The instruction sets 116 of each of the additional processor elements include a user-level synchronize and end instruction 118. The user-level fork instruction and the user-level synchronize and end instructions are user-level instructions that may be executed at an unprivileged level or user level of execution. Each of the instruction sets may also optionally include one or more non-user-level or privileged instructions (not shown), which may not be executed at the unprivileged level or user level of execution. Rather, the non-user-level or privileged instructions may only be executed at a non-user-level or at least partly privileged level of execution (e.g., at ring 0), which may be reserved for an operating system, hypervisor, virtual machine manager, or other privileged or supervisory entity.

In some embodiments, the user-level fork instruction 106, and the user-level synchronize and end instructions 118, may allow a user to implement fork-and-join constructs in user-level applications or software. In the fork-and-join constructs, the execution of a given portion of software (e.g., a given software thread) may branch or fork into multiple parallel executions of software (e.g., multiple data parallel workloads or parallel software threads), and then subsequently these multiple parallel executions may end or yield and merge or join, and execution of the given portion of software (e.g., the given software thread) may resume. In some embodiments, the user-level fork instruction 106, may be operative to specify, demarcate, or otherwise indicate the start of a portion of software that is to be performed in parallel on each of the plurality of additional processor elements 114, and the user-level synchronize and end instructions 118, may be operative to specify, demarcate, or otherwise indicate the end of the portion of software.

The first processor element may have a first decode unit 108. The user-level fork instruction may be provided to the first decode unit 108. The first decode unit may be operative to decode the user-level fork instruction. In some embodiments, the user-level fork instruction may explicitly specify or otherwise indicate at least one instruction address. In some embodiments, the instruction may specify or otherwise indicate a single instruction address which represents the first or beginning instruction of the portion of code to be executed in parallel on each of the additional processor elements at which each of the additional processor elements is to begin. In other embodiments, the instruction may specify a plurality of potentially/optionally different instruction addresses (e.g., may specify one or a plurality of vector registers each having a vectors worth of instruction addresses) which may each be used by a different one of the additional processor elements (e.g., each processor element may begin at a different instruction address to work in parallel on different portions of a data parallel workload). The first processor element may also have a user-level thread fork module 110 that is coupled with the decode unit. The user-level thread fork module may represent one or more execution units or other execution logic to perform or implement the user-level fork instruction. In some embodiments, the user-level thread fork module 110 may be responsive to the user-level fork instruction 106 (e.g., responsive to the user-level fork instruction being decoded and/or one or more control signals decoded or otherwise generated from the user-level fork instruction) to cause a branch or fork in program control flow. In some embodiments, the user-level thread fork module 110, responsive to the user-level fork instruction, may be operative to configure or otherwise cause each of the plurality of additional processor elements 114 to perform a set of instructions or a portion of software in parallel. In some embodiments, each of the additional processor elements may be configured or otherwise caused to start execution at one of at least one instruction address indicated by the user-level fork instruction 106. As previously mentioned, in some embodiments the instruction may indicate a single address, whereas in other embodiments may indicate a plurality of potentially/optionally different addresses (e.g., one or more vectors worth of addresses). In some embodiments, the user-level fork instruction may implicitly indicate a static or fixed number of the additional processor elements (e.g., all of the available additional processor elements may be used). Alternatively, the user-level fork instruction may explicitly specify or otherwise indicate a flexible number of the additional processor elements, and that number may be dynamically allocated (e.g., one or more of the total number of additional processor elements may not be used to run the parallel software).

Each of the plurality of additional processor elements 114 may be operative to perform a user-level synchronize and end instruction 118. In some embodiments, each of the additional processor elements may have a corresponding decode unit 120 to decode the user-level synchronize and end instruction. In some embodiments, each of the additional processor elements 114 may have a corresponding user-level synchronized thread end module 122 that is coupled with the corresponding decode unit 120. Each user-level synchronized thread end module 122 may represent one or more execution units or other execution logic to perform or implement the user-level synchronize and end instruction 118. In some embodiments, each user-level synchronized thread end module 122 may be operative, responsive to the user-level synchronize and end instruction 118 (e.g., responsive to the instruction being decoded and/or one or more control signals decoded or otherwise generated from the instruction), to configure or otherwise cause its corresponding processor element (in which it is included) to perform a synchronized end of the corresponding thread or execution in preparation for a synchronized join or merge in the program control flow. In some embodiments, each processor element 114, when performing user-level synchronize and end instruction 118, may both implement a synchronization barrier and a synchronized control flow transfer back to the software thread or other portion of software executing on the first processor element. In some embodiments, each processor element 114, when performing the user-level synchronize and end instruction, may stop performing additional instructions, and wait (e.g., at a synchronization barrier) until each of the other additional processor elements 114 has performed a corresponding user-level synchronize and end instruction (e.g. reached the synchronization barrier). Then, in some embodiments, when all of the additional processor elements has performed its corresponding user-level synchronize and end instruction, the join or merge in program control flow may be performed and control flow may transfer back to an appropriate instruction in the portion of software executing on the first processor element 102. In one aspect, all of the parallel executions on the additional processor elements may terminate and execution may continue only on the first processor element.

Advantageously, the user-level fork and user-level synchronize and end instructions may represent a user-level architectural mechanism that may allow a user, programmer, or compiler to explicitly program or implement fork and join constructs or semantics in user-level applications. The fork-and-join constructs do not need to be defined by a software runtime involving system calls to operating system (or other supervisory system software) managed threads, which generally tend to have high overhead (e.g., due to messaging, etc.), and consequently generally tend to be limited in practice to relatively large workloads or portions of code being executed in parallel (e.g., coarse-grained parallel processing). Rather, through the use of these user-level fork and user-level synchronized and end instructions, there may be no need for intervention of and/or no need to yield to an operating system or other supervisory system software in order to implement the fork and join.

Moreover, in some embodiments, the parallel executions running on the additional processor elements (e.g., the parallel software threads) may not be managed directly by the operating system or other supervisory system software. In one aspect, the parallel executions running on the additional processor elements (e.g., the parallel software threads) may optionally be invisible, or at least substantially invisible to, the operating system or other supervisory system software (e.g., the OS may be unaware that these parallel executions are running on the additional processor elements). By contrast, in some embodiments, the thread or portion of software running on the first processor element which had the user-level fork instruction 106 may have been scheduled on the first processor element 102 by supervisory system software (e.g., a thread scheduler module of an operating system), and may be visible to, and managed by, the supervisory system software. As a result, the user-level fork and user-level synchronize and end instructions may help to reduce the amount of overhead generally expected for such parallel execution. In one aspect, the user-level fork and user-level synchronize and end instructions may optionally/potentially be used to efficiently execute smaller workloads or portions of code in parallel (e.g., finer-grained parallel processing), than would generally be practical if instead the threads were scheduled and managed via a software runtime by calls to the operating system (or other supervisory system software).

A detailed example embodiment of a processor 100 has been shown and described, although various alternate embodiments are contemplated. In some embodiments, the processor may implement the user-level fork instruction, but optionally without implementing the user-level synchronize and end instruction. For example, the processor may optionally have a first processor element 102 with an instruction set that includes a user-level fork instruction 106, but the additional processor elements 114 may have instruction sets that omit the described user-level synchronize and end instructions 118. In other embodiments, the processor may implement the user-level synchronize and end instruction, but optionally without implementing the user-level fork instruction. For example, the processor may optionally have the additional processor elements 114 that have instruction sets that include the described user-level synchronize and end instructions 118, but the first processor element 102 may have an instruction set that optionally omits the described user-level fork instruction 106. In some embodiments, instead of a user-level synchronize and end instruction, a user-level end instruction may optionally be implemented without a synchronize functionality or capability. For example, a separate instruction (e.g., with a different opcode) may be used to implement the synchronize functionality, and may be used in combination with a user-level end instruction that omits the synchronize capability. Other variations will be apparent to those skilled in the art and having the benefit of the present disclosure.

To avoid obscuring the description, a simplified processor 100 has been shown and described. However, the processor may optionally include other components. For example, various different embodiments may include various different combinations and configurations of the components shown and described for any of FIGS. 9-11. All of the components of the processor may be connected or coupled together to allow them to operate.

Figure 2:
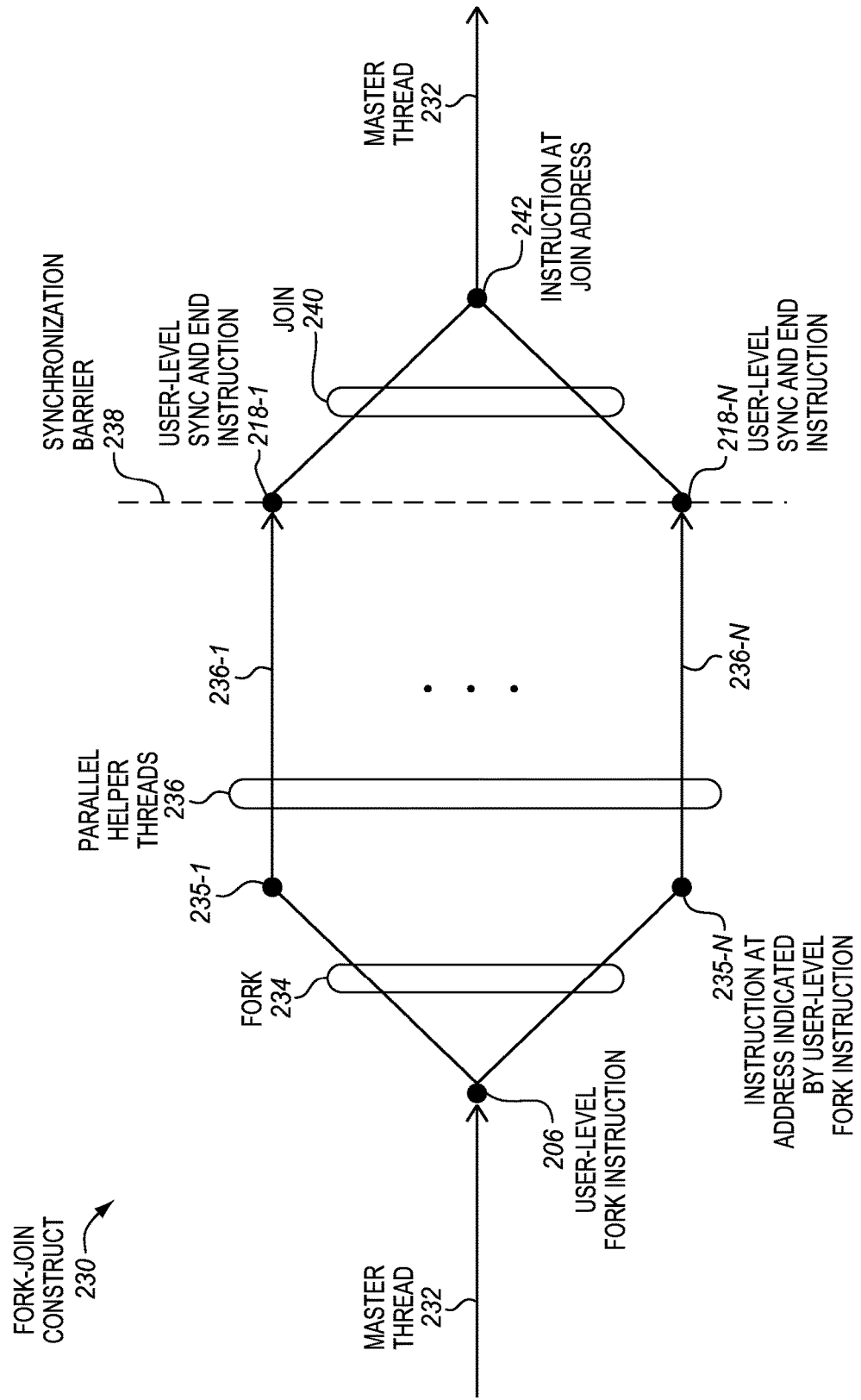
FIG. 2 is a diagram illustrating an example of a fork-join construct implemented using an embodiment of a user-level fork instruction, and an embodiment of multiple user-level synchronize and end instructions.

FIG. 2 is a diagram illustrating an example of a fork-join construct 230 implemented using an embodiment of a user-level fork instruction 206, and an embodiment of multiple user-level synchronize and end instructions 218. The fork-join construct includes a master software thread 232, which may be performed on a first processor element (e.g., first processor element 102). The master software thread includes a user-level fork instruction 206. In some embodiments the user-level fork instruction may explicitly specify, or otherwise indicate, at least one address (e.g., an address of a beginning instruction of a set of instructions, which is to be performed in parallel on each of a plurality of additional processor elements). For example, in various embodiments, the user-level fork instruction may have a field to explicitly specify a register (e.g., an architectural general-purpose register) that has at least one value that explicitly specifies or otherwise indicates (e.g., provides at least one offset to or otherwise indicate) the at least one address, may have a field to explicitly specify a memory location that has at least one value that explicitly specifies or otherwise indicates the at least one address, implicitly indicate a register that has at least one value that explicitly specifies or otherwise indicates the at least one address, or have an immediate to provide at least one value that explicitly specifies or otherwise indicates the at least one address.

When performed (e.g., by the first processor element), the user-level fork instruction 206 may cause the first processor element to spawn, schedule, otherwise configure, or otherwise cause a branch or fork 234 in program control flow which may initiate execution of multiple helper software threads 236 in parallel each on a different one of a plurality of additional processor elements (e.g., the additional processor elements 114). The multiple helper software threads may include a first helper software thread 236-1 through an Nth helper software thread 236-N, where the number of helper software threads may be any desired number appropriate for the particular implementation (e.g., sometimes from two to about one hundred). By way of example, the helper software threads may represent numerous different types of procedures or workloads, such as, for example, graphics, audio, signal processing, scientific computing, transaction, database processing, or various other procedures or workloads. In some embodiments, each of the helper software threads may begin by executing a different corresponding instance of the same instruction 235 at the single instruction address that is indicated by the user-level fork instruction. For example, the user-level fork instruction may cause the same instruction address to be stored in each of a plurality of program counters (e.g., registers) that may each correspond to a different one of the multiple additional processor elements that are being used to perform the corresponding helper software threads 236. Program counters are also known in the arts as instruction pointers. Alternatively different instruction addresses may be indicated by the instruction, different instruction addresses may be stored in the program counters, and different corresponding instructions may be executed initially by the different processor elements. After each helper software thread performs its corresponding beginning instruction 235, they may optionally/potentially execute different sequences of instructions (e.g., may take different branches, jump or move around differently, make different procedure calls, etc.). Advantageously, these parallel helper software threads may help to increase data throughput and/or performance. For example, each of the parallel helper software threads may work on a different portion of a parallelizable or threadable workload, such as, for example, a graphics workload, a scientific computing workload, etc. Rather than the master thread needing to perform all tasks related to the overall workload serially, the parallel helper software threads may perform different portions of the overall workload at least partly in parallel.

At some point, each processor element that is performing one of the helper software threads 236 in parallel may perform a corresponding instance of a user-level synchronize and end instruction 218. For example, the first helper software thread may include a first user-level synchronize and end instruction 218-1, and the Nth helper software thread may include an Nth user-level synchronize and end instruction 218-N. These user-level synchronize and end instructions may be performed at different times depending in part upon the different ways in which the different helper software threads execute (e.g., branch, jump, etc.). In some embodiments, the user-level synchronize and end instructions 218 may be operative to configure or otherwise cause a synchronization barrier 238. In some embodiments, each of the processor elements, in response to performing the corresponding user-level synchronize and end instruction 218, may stop performing additional instructions of the corresponding helper software thread 236, and may wait at the synchronization barrier 238 (e.g., the corresponding program counter may not advance) until all of the other processor elements being used to perform the helper software threads 236 have performed their corresponding user-level synchronize and end instructions 218. Then, when all of the other processor elements have performed their corresponding user-level synchronize and end instructions 218, the last performed user-level synchronize and end instruction 218 may cause a synchronized merge or join 240 in control flow that may cause execution of the parallel helper software threads 236 to terminate and execution to continue with an instruction 242 at an appropriate join address in the master thread 232.

Figure 3:
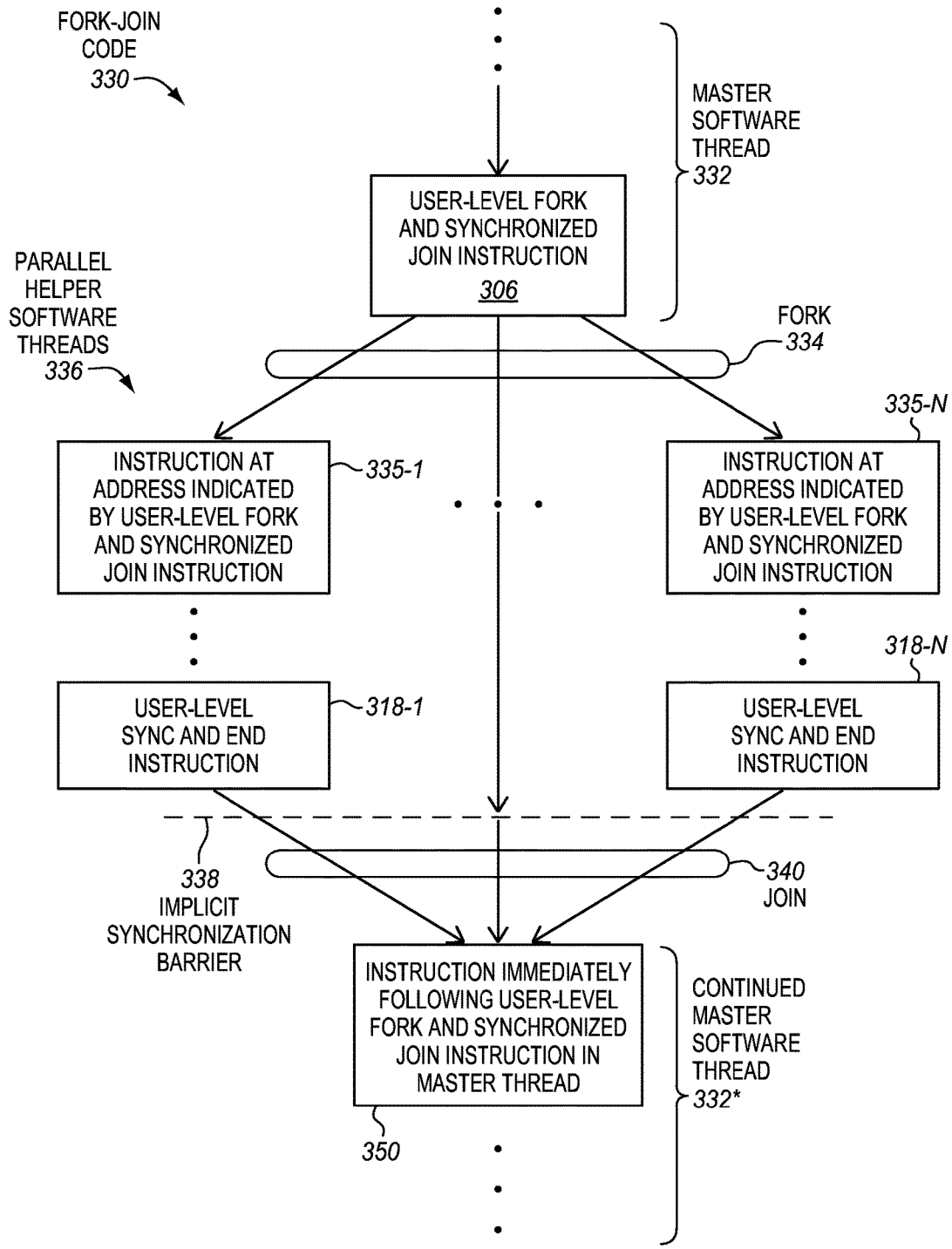
FIG. 3 is a block diagram of fork-join code with an embodiment of a user-level fork instruction that is operative to cause a thread to wait at a synchronization barrier.

FIG. 3 is a block diagram of fork-join code 330 that includes an embodiment of a user-level fork and synchronized join instruction 306 that is operative to configure or otherwise cause a master thread 332 to stop execution and wait at an implicit synchronization barrier 338. The master thread 332 may run on a first processor element (e.g., processor element 102). The master thread includes the user-level fork and synchronized join instruction 306. The user-level fork and synchronized join instruction when performed may configure or otherwise cause a branch or fork 334 in control flow in which a plurality of parallel helper software threads 336 may each be initiated to run on a different one of a plurality of additional processor elements (e.g., additional processor elements 114). In this embodiment, the user-level fork and synchronized join instruction when performed may also configure or otherwise cause the processor element performing the master software thread 332 to stop performing additional instructions of the master software thread 332, and further execution to wait at an implicit synchronization barrier 338, and then a join to occur at an instruction address determined by the user-level fork and synchronized join instruction (e.g., an instruction 350 immediately following the user-level fork and synchronized join instruction 306 in original program order).

In some embodiments, the user-level fork and synchronized join instruction may indicate a single instruction address and each of the parallel helper software threads 336 may begin execution at a corresponding instance of the same instruction 335, which is located at the single instruction address that is specified or otherwise indicated by the user-level fork instruction 306. Each of the parallel helper software threads may then perform a potentially different set of additional instructions (e.g., due to different branching, jumping, procedure calls, etc.). Alternatively, the user-level fork instruction may indicate multiple potentially/optionally different instruction addresses and each of the parallel helper software threads may begin execution at an optionally/ potentially different instruction address. Eventually, each of the parallel helper software threads may, typically at a different time, perform corresponding instance of a user-level synchronize and end instruction 318. Each of the processor elements, when it performs the corresponding user-level synchronize and end instruction, may stop performing additional instructions of the corresponding helper software thread, and further execution may wait at the same implicit synchronization barrier 338 which is being observed by the master software thread 332. When each and all of the other parallel helper software threads has performed it's corresponding user-level synchronize and end instruction, the last processor element performing its corresponding user-level synchronize and end instruction may configure or otherwise cause a merge or join 340 in control flow back to an appropriate join address (e.g., a join instruction address determined by the user-level fork and synchronized join instruction). Execution of each of the parallel helper software threads may terminate. Continued execution of the master software thread 332* may continue with an instruction 350 immediately following the user-level fork and synchronized join instruction in the master thread. In this embodiment, the term implicit is used for the implicit synchronization barrier because the synchronization barrier is implicit or inherent for the user-level fork and synchronized join instruction instead of a separate instruction being used to create an explicit synchronization barrier.

Figure 4:
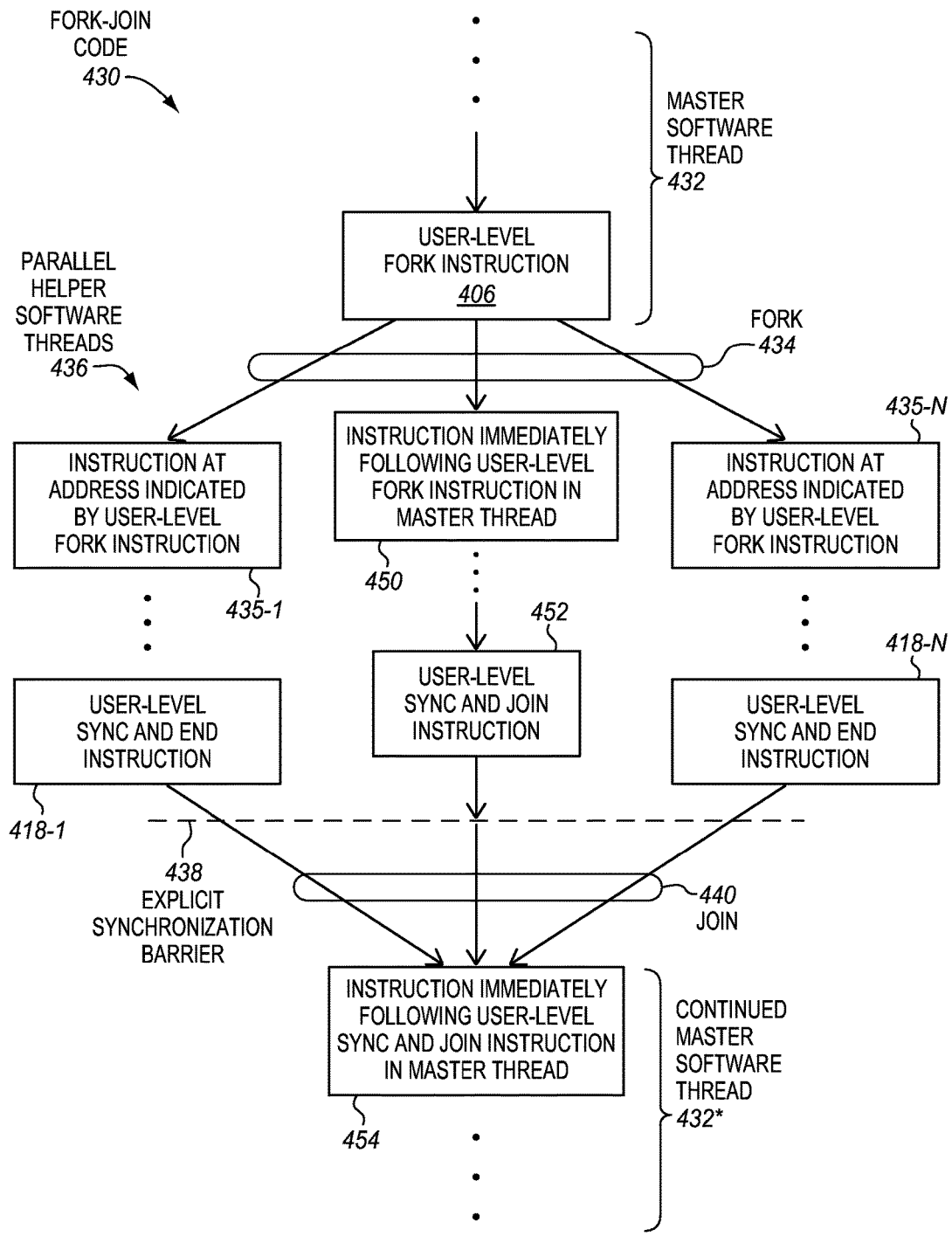
FIG. 4 is a block diagram of fork-join code with an embodiment of a user-level fork instruction and a separate user-level synchronize and join instruction that is operative to cause a thread to wait at a synchronization barrier.

FIG. 4 is a block diagram of fork-join code 430 that includes an embodiment of a user-level fork instruction 406 and a separate user-level synchronize and join instruction 452 that is operative to configure or otherwise cause a master thread 432 to stop execution and wait at an explicit synchronization barrier 438.

The master thread 432 may run on a first processor element (e.g., processor element 102). The master thread includes the user-level fork instruction 406. The user-level fork instruction when performed may configure or otherwise cause a branch or fork 434 in control flow in which a plurality of parallel helper software threads 436 may each be initiated to run on a different one of a plurality of additional processor elements (e.g., additional processor elements 114). In this embodiment, the user-level fork instruction 406 when performed does not cause the processor element that is performing the master software thread 432 to stop performing additional instructions or to wait at a synchronization barrier. Rather, the processor element may continue to perform one or more additional instructions of the master software thread including an instruction 450 immediately after the user-level fork instruction 406 in original program order in the master thread.

The master software thread may also include a user-level synchronize and join instruction 452. The user-level synchronize and join instruction when performed may be operative to configure or otherwise cause the processor element performing the master software thread to stop executing additional instructions of the master software thread and for continued execution to wait at an explicit synchronization barrier 438. In some embodiments, the user-level synchronize and join instruction 452 may have a different opcode than the user-level fork instruction 406. In some embodiments, the user-level synchronize and join instruction 452 may have a same opcode as the user-level synchronize and end instruction 418. In other embodiments, the user-level synchronize and join instruction 452 may have a different opcode than the user-level synchronize and end instruction 418.

In some embodiments, the user-level fork instruction may optionally indicate a single instruction address, and each of the parallel helper software threads 436 may begin execution at a corresponding instance of the same instruction 435, which is located at the single instruction address that is specified or otherwise indicated by the user-level fork instruction 406. Each of the parallel helper software threads may then perform a potentially different set of additional instructions (e.g., due to different branching, jumping, procedure calls, etc.). Alternatively, the user-level fork instruction may indicate multiple potentially/optionally different instruction addresses and each of the parallel helper software threads may begin execution at an optionally/potentially different instruction address. Eventually, each of the parallel helper software threads may, typically at a different time, perform corresponding instance of a user-level synchronize and end instruction 418. Each of the processor elements, when it performs the corresponding user-level synchronize and end instruction, may stop performing additional instructions of the corresponding helper software thread, and further execution may wait at the same explicit synchronization barrier 438 which is being observed by the master software thread 432 due to the user-level synchronize and join instruction 452. When each and all of the other parallel helper software threads has performed it's corresponding user-level synchronize and end instruction, the last processor element performing its corresponding user-level synchronize and end instruction may configure or otherwise cause synchronized a merge or join 440 in control flow. Execution of each of the parallel helper software threads may terminate. Continued execution of the master software thread 432* may continue with an instruction at an appropriate join address as determined by the user-level synch and join instruction, such as, for example, an instruction 454 immediately following the user-level synchronize and join instruction 452 in original program order in the master thread.

As described above, a first processor element (e.g., first processor element 102) may perform an embodiment of a user-level fork instruction (e.g., user-level fork instruction 106), and each of a plurality of additional processor elements (e.g., additional processor elements 114) may perform an embodiment of user-level synchronize and end instruction (e.g., user-level synchronize and end instruction 118). In some embodiments, homogeneous processor elements may be used for the first processor element and each of the additional processor elements. In other embodiments, the first processor element may have a heterogeneous or different design relative to each of the additional processor elements.

Figure 5:
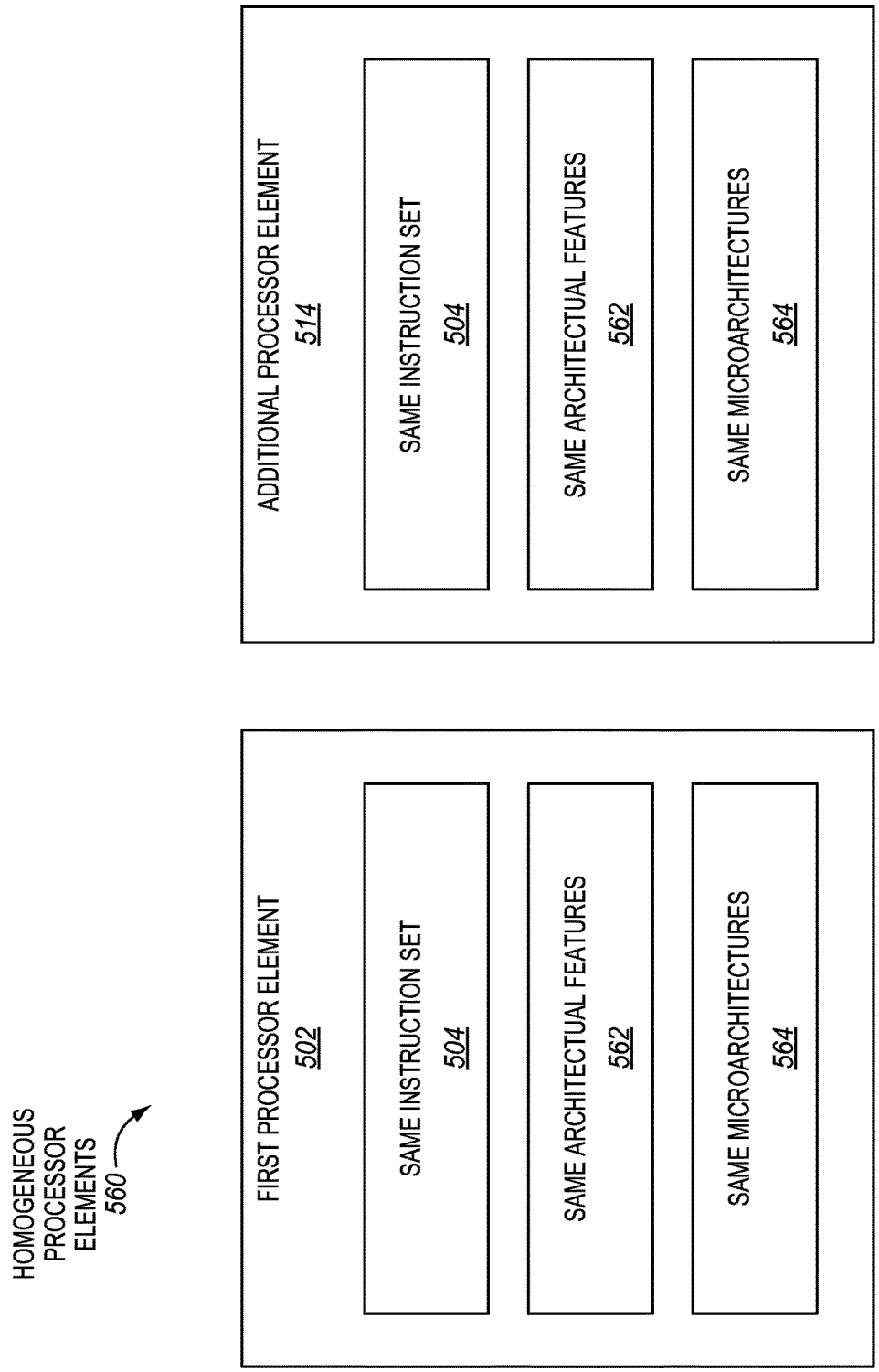
FIG. 5 is a block diagram of an example embodiment of a suitable pair of homogeneous processor elements.

FIG. 5 is a block diagram of an example embodiment of a pair of homogeneous processor elements 560 including a first processor element 502 that is suitable to perform a serial thread including a user-level fork instruction, and an additional processor element 514 that is suitable to perform one of a plurality of parallel threads including a user-level synchronize and end instruction. The pair of homogeneous processor elements may be substantially identical. For example, each of the homogeneous processor elements may be a core, hardware thread, or the like with an identical design. In some embodiments, both the first and additional processor elements may have a same instruction set 504, both the first and additional processor elements may have a same set of architecture features 562 (e.g., architectural registers, data types, etc.), and both the first and additional processor elements may have a same microarchitecture 564.

Figure 6:
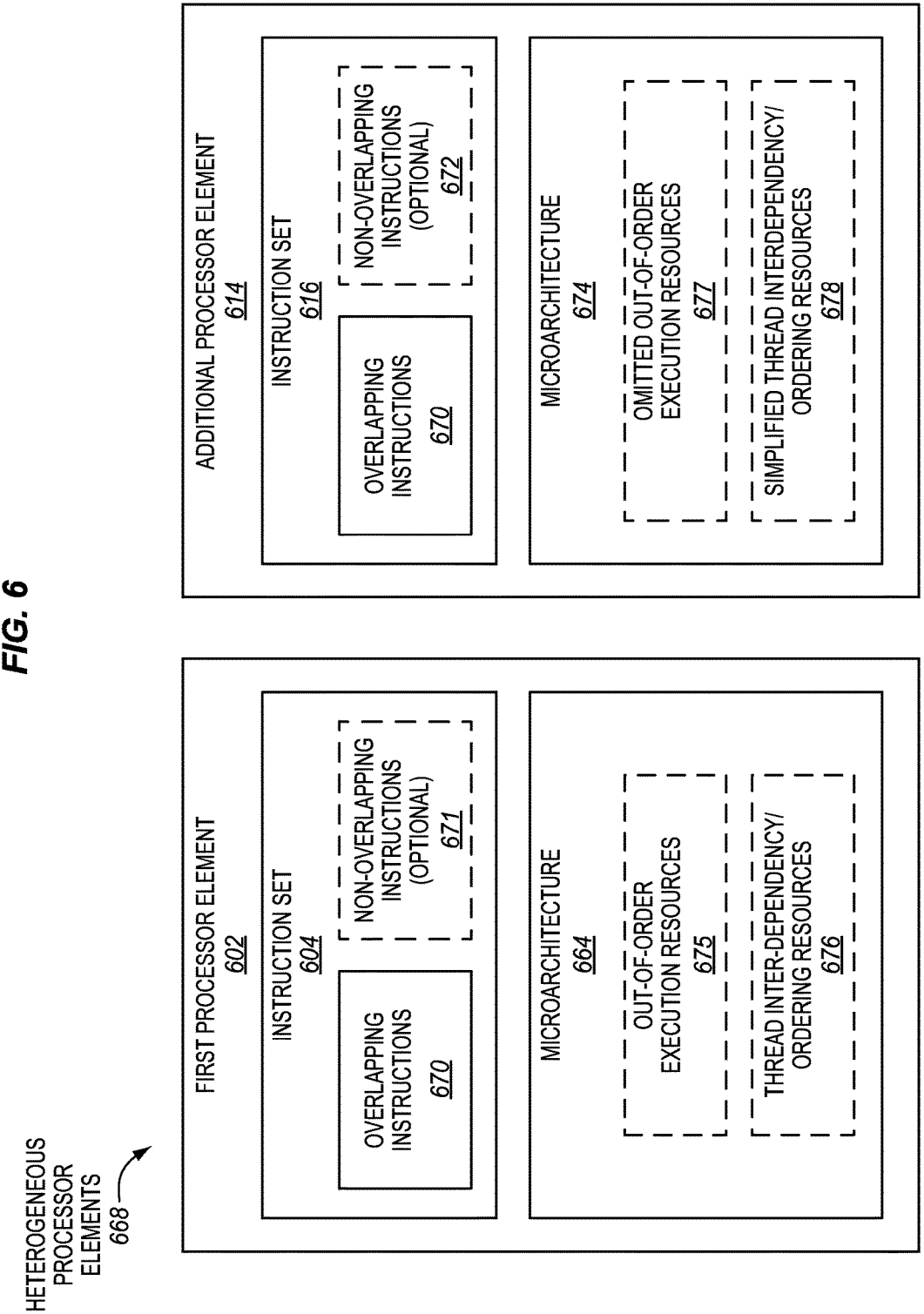
FIG. 6 is a block diagram of an example embodiment of a suitable pair of heterogeneous processor elements.

Alternatively, rather than using homogeneous processor elements, there may be advantages to using heterogeneous processor elements. For example, it may be advantageous to design or optimize the processor elements that are to perform the parallel threads differently than the processor element that is to perform the serial thread. FIG. 6 is a block diagram of an example embodiment of a pair of heterogeneous processor elements 668 including a first processor element 602 that is suitable to perform a serial thread including a user-level fork instruction, and an additional processor element 614 that is suitable to perform one of a plurality of parallel threads including a user-level synchronize and end instruction.

The heterogeneous processor elements may be different in different ways in different embodiments. As shown, in some embodiments, an instruction set 604 of the first processor element may optionally be different than an instruction set 616 of the additional processor element. For example, both of the instruction sets may include a set of overlapping instructions 670, although the instruction set of the first processor element may optionally include one or more non-overlapping instructions 671 that are not included in the instruction set 616 of the additional processor element and/or the instruction set of the additional processor element may optionally include a set of one or more non-overlapping instructions 672 that are not included in the instruction set 604 of the first processor element. As one example, in some embodiments, the additional processor element 614 (i.e., which is to execute the parallel threads and the user-level synchronize and end instruction) may optionally be dedicated exclusively to a user level or non-privileged level of execution privilege. In such embodiments, the additional processor element may optionally omit all privileged or non-user level instructions that are included in the instruction set of the first processor element. In other embodiments, the instruction sets may be different in different ways. For example, any instructions not needed to perform a given type of code intended for the parallel threads may optionally be omitted from the instruction set of the additional processor element.

As shown, in some embodiments, a microarchitecture 664 of the first processor element may optionally be different than a microarchitecture 674 of the additional processor element. For example, in some embodiments, the microarchitecture of the first processor element may optionally be designed to emphasize reducing instruction performance latency, whereas the microarchitecture of the additional processor element may optionally be designed not so much to emphasize reducing performance latency but rather to emphasize increased throughput. For example, to reduce latency, out-of-order execution and/or other sophisticated mechanisms may optionally be employed. However, out-of-order execution resources and other such sophisticated resources may tend to compete with an ability to design the processor to achieve maximum parallel throughput. For example, when each core is relatively bigger to accommodate the out-of-order and/or other sophisticated resources, fewer of these bigger cores may be able to fit on the same size die as compared to the number of smaller cores that omit such resources. If instead more of the smaller cores were included on the die then a higher throughput may be achieved by running more threads even if each of these threads has a higher latency. When there are many such threads, keeping the threads busy becomes more important than reducing the latency of the individual threads. Also, the out-of-order execution resources may tend to consume more power for the same throughput.

Accordingly, in some embodiments, the microarchitecture of the first processor element may optionally be an out-of-order execution microarchitecture, whereas the microarchitecture of the additional processor element may optionally be an in-order microarchitecture, a substantially in-order microarchitecture, or at least a significantly more in-order microarchitecture than the microarchitecture of the first processor element. In some embodiments, the microarchitecture of the first processor element may include one or more out-of-order execution resources 675, whereas the microarchitecture of the additional processor element may optionally omit 677 such out-of-order execution resources. Examples of such out-of-order resources include, but are not limited to, a reservation station, instruction buffer, or other instruction queue to store instructions until their input operands are available, an out-of-order issue unit to issue instructions to execution units out-of-order, a reorder buffer or other instruction buffer or queue to reorder instructions and their results back into original program order, and a commit unit to commit results of instructions executed out-of-order to architectural state in original program order. In various embodiments, the first processor element (i.e., to perform the user-level fork instruction) may have a commit unit but the additional processor element (i.e., to perform the user-level synchronize and end instruction) may not, and/or the first processor element may have a reorder buffer but the additional processor element may not, and/or the first processor element may have a reservation station but the additional processor element may not. In some embodiments, the first processor element may have a relatively lower average instruction performance latency, whereas the additional processor element may have a relatively higher average instruction performance latency.

As another example, in some embodiments, one or more microarchitectural resources which are either needed or relatively more helpful to perform one type of code having the user-level fork instruction (e.g., the master thread), but which are either not needed or not as helpful to perform another type of code having the user-level synchronize and end instruction (e.g., one of the parallel helper threads), may optionally be included in the first processor element 602, but optionally omitted from the additional processor element 614. In some embodiments, different types of code or objectives may be intended for the first processor element and the additional processor element and their microarchitectures may differ correspondingly. In some embodiments, the microarchitecture of the additional processor element may optionally include simplified thread inter-dependency and/or ordering resources 678, which may optionally be simplified relative to thread inter-dependency and/or ordering resources 676 of the microarchitecture of the first processor element. In one aspect, both the first processor element and the additional processor element may need to obey the ordering rules associated with accessing shared memory, however since the additional processor element may be in-order or at least more in order than the out-of-order first processor element, the mechanisms within the additional processor element to enforce such shared memory access ordering rules may be simplified. In other words, complexities often needed in the out-of-order first processor element may optionally be omitted from the in order or more in order additional processor element. For example mechanisms to implement memory access fencing instructions (e.g., store fence instructions, load fence instructions, memory fence instructions, etc.) may optionally be simplified in the additional processor element relative to those in the first processor element. In other embodiments, other microarchitectural resources which are included in the microarchitecture of the first processor element may optionally be omitted from the microarchitecture of the additional processor element if the parallel code (e.g., the parallel helper threads) either do not need those resources or do not benefit as greatly by having those resources.

As another example, in some embodiments, the additional processor elements (e.g., including additional processor element 614) may share resources which are not shared by the first processor element 602 and/or the additional processor elements (e.g., including additional processor element 614) may share resources to a greater extent than the first processor element 602. As one example, in some embodiments, a larger number of the additional processor elements 614 may share a decoder, whereas a fewer number of the first processor element 602 may share a decoder. For example, in various embodiments, from one to about ten, or from one to about five, of the first processor element 602 may share a decoder, whereas from ten to three hundred, or from twenty to three hundred, or from fifty to three hundred, of the additional processor elements 614 may share a decoder. In some embodiments, the additional processor elements 614 may utilize a cache of decoded instructions, and since the additional processor elements may mostly run the same or similar instructions in most cases decoded instructions may already be present in the cache, so the decoder may be utilized by a larger number of the additional processor elements than would generally be practical for the first processor element which executes more heterogeneous code.

As another example, in some embodiments, a greater number of the additional processor elements 614 may share a lowest level or level 1 (L1) cache, which is closest to the execution units, as compared to a number of the first processor element or elements 602 which share a lowest level or level 1 (L1) cache. For example, in various embodiments, from one to eight, or one to four, of the first processor elements 602 may share an L1 cache, whereas more than ten, or more than twenty, of the additional processor elements may share an L1 cache.

FIG. 7 is a block diagram of an example embodiment of a processor 700 to perform an embodiment of a user-level fork instruction 706. The processor includes a first processor element 702 and a plurality of additional processor elements 714 including a first additional processor element 714-1 through an Nth additional processor element 714-N. The first processor element has an instruction fetch unit 781. The fetch unit may fetch the user-level fork instruction, for example, from memory based on an indication of the next instruction to fetch from a program counter 783 of the first processor element. The user-level fork instruction may represent a macroinstruction, assembly language instruction, machine code instruction, or other instruction or control signal of an instruction set of the first processor element. In some embodiments, the user-level fork instruction may explicitly specify (e.g., through one or more fields or a set of bits), or otherwise indicate (e.g., implicitly indicate), at least one instruction address. The different ways of indicating the instruction address previously mentioned are suitable.

The fetch unit may provide the user-level fork instruction to a decode unit 708. The decode unit may decode the user-level fork instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level user-level fork instruction. In some embodiments, the decode unit may include one or more input structures (e.g., port(s), interconnect(s), an interface) receive the user-level fork instruction, an instruction recognition and decode logic coupled therewith to recognize and decode the user-level fork instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

A user-level thread fork module 710 is coupled with the decode unit 708. The user-level thread fork module may represent one or more execution units to perform or implement the user-level fork instruction. The user-level thread fork module may receive the one or more decoded or otherwise converted instructions or control signals that represent and/or are derived from the user-level fork instruction. The user-level thread fork module and/or the processor may include specific or particular logic (e.g., transistors, integrated circuitry, or other hardware potentially combined with firmware (e.g., instructions stored in non-volatile memory) and/or software) that is operative to perform the user-level fork instruction (e.g., in response to one or more instructions or control signals decoded from the user-level fork instruction). The user-level thread fork module may be operative in response to and/or as a result of the user-level fork instruction (e.g., in response to one or more instructions or control signals decoded from the instruction) to configure each of the plurality of additional processor elements 714 to perform instructions in parallel starting at the one or more instruction addresses indicated by the user-level fork instruction.

In some embodiments, the user-level thread fork module responsive to the instruction may store the one or more instruction addresses 786 in one or more storage locations 785 that are accessible to both the first processor element and each of the additional processor elements. As shown, in some embodiments, an instruction address 786-1 through 786-N may optionally be stored for each of the additional processor elements 714-1 through 714-N that are to be used for parallel processing. As previously mentioned, in some embodiments the same single address may be stored for each of the additional processor elements, or in other embodiments a potentially/optionally different instruction address (e.g., from a different data element of a vector register) may be stored for each of the additional processor elements. Each of the additional processor elements may access the one or more instruction addresses 786 and begin parallel processing at that instruction address. In some embodiments, each of the additional processor elements may copy or store this instruction address into a corresponding program counter or instruction pointer. Alternatively, the user-level thread fork module may be operative responsive to the user-level fork instruction to store this address directly into each of the program counters or instruction pointers.

The first processor element also has architectural state 784. In some embodiments, the architectural state 784 may include the contents or values of one or more architectural registers, such as, for example, general-purpose registers, packed data registers, floating point registers, status registers, or the like, potentially with other architectural state of the first processor element. In some embodiments, the user-level thread fork module responsive to the instruction may store one or more copies of some or all of the architectural state 784 as architectural state 787 in the one or more storage locations 785. In one embodiment, the architectural state may include values or contents of one or more sets of architectural registers of the processor, as previously mentioned. As shown, in some embodiments, a different corresponding copy of the architectural state 787-1 through 787-N may optionally be stored for each of the additional processor elements 714-1 through 714-N that are to be used for parallel processing. Subsequently, each of the additional processor elements may access the one or more sets of the architectural state and use that architectural state in the parallel processing. In some embodiments, each of the additional processor elements may optionally copy or store this architectural state into a local storage corresponding to each of the additional processor elements, such as, for example, a replicate set of architectural registers, one or more caches (e.g., a register cache), or other local storage device.

Different types of storage locations 785 are suitable for different embodiments. Examples of suitable storage locations include, but are not limited to, one or more registers of the first processor element, one or more registers of the additional processor elements, memory locations in a memory shared by the first processor element and each of the additional processor elements, and the like, and combinations thereof. In some embodiments, the storage locations may represent one or more memory locations in a user-addressable memory space that is shared by the first processor element and each of the additional processor elements which is used to implement a parallel processing control data structure. In some embodiments, this parallel processing control data structure is separate from a procedure call stack used by an operating system. In some embodiments, this parallel processing control data structure may be accessible to both the first processor element and each of the additional processor elements and may be used to pass various different types of control and data desired for the particular implementation between the first processor element and each of the additional processor elements. Alternatively, various other types of storage locations may optionally be used instead.

In some embodiments, after the one or more instruction addresses and one or more sets of architectural state have been stored, the user-level thread fork module, responsive to the instruction, may send one or more control signals to activate or initiate each of the additional processor elements to being parallel processing. Alternatively, in other embodiments, this additional operation may optionally be omitted, since it may be inferred based on other criteria (e.g., a value being programmed into a program counter or the storage locations 785, the architectural state being programmed into the storage locations 785, etc.). In some embodiments, there may be no need for invention from, and may be no need to yield to an operating system, in order to initiate these additional processor elements to perform the parallel processing.

In some embodiments, the user-level fork instruction may also optionally impose a synchronization barrier on the thread or other code executing on the first processor element, although this is not required (e.g., a separate user-level synchronize and join instruction may optionally be used). As shown, in such embodiments, the first processor element may optionally include a synchronized join module 782. The synchronized join module may be coupled with the decode unit. In some embodiments, responsive to the user-level fork instruction, the synchronized join module may be operative to freeze the program counter 783 or otherwise cause the program counter to stop incrementing. This may cause execution of further instructions by the thread and/or first processor element to stop. As shown, the synchronized join module may be coupled with a synchronization barrier structure 788. The plurality of additional processor elements may each also be coupled with the synchronization barrier structure. Each of the additional processor elements when it performs a user-level synchronize and end instruction may update a corresponding status in the synchronization barrier structure. As one example, the synchronization barrier structure may be a counter that gets either incremented or decremented each time one of the additional processor elements performs its user-level synchronize and end instruction. As another example, the synchronization barrier structure may include a register having a different corresponding bit for each of the additional processor elements and the corresponding bit may either be set or cleared, as desired for the particular implementation, when each of the additional processor elements performs its user-level synchronize and end instruction. The synchronized join module 782 may observe the status in the synchronization barrier structure, and when the status indicates that all of the additional processor elements has performed their corresponding user-level synchronize and end instructions, may cause the program counter 783 to resume incrementing. The fetch unit may then fetch additional instructions, which may be decoded and executed as the thread or other portion of code continues to be performed by the first processor element.

FIG. 8 is a block diagram of an example embodiment of a processor 800 to perform an embodiment of a user-level synchronize and end instruction 818. The processor includes an additional processor element 814 to perform the user-level synchronize and end instruction. The processor also includes a first processor element 802 (e.g., which without limitation may have previously performed a user-level synchronize and end instruction (e.g., instruction 706)). The additional processor element has an instruction fetch unit 881 which may fetch the user-level synchronize and end instruction (e.g., from memory) based on an indication of the next instruction to fetch from a program counter 883 of the additional processor element. The user-level synchronize and end instruction may represent a macroinstruction, assembly language instruction, machine code instruction, or other instruction or control signal of an instruction set of the additional processor element.

The fetch unit may provide the user-level synchronize and end instruction to a decode unit 808. The decode unit may decode the user-level synchronize and end instruction 818. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level user-level synchronize and end instruction. The decode unit may be implemented using the same approaches as other decoders described herein.

A user-level synchronized thread end unit or module 890 is coupled with an output of the decode unit 808. The user-level synchronized thread end module may represent one or more execution units to perform or implement the user-level synchronize and end instruction. The user-level synchronized thread end module may receive the one or more decoded or otherwise converted instructions or control signals that represent and/or are derived from the user-level synchronize and end instruction. The user-level synchronized thread end module and/or the processor may include specific or particular logic (e.g., transistors, integrated circuitry, or other hardware potentially combined with firmware (e.g., instructions stored in non-volatile memory) and/or software) that is operative to perform the user-level synchronize and end instruction (e.g., in response to one or more instructions or control signals decoded from the user-level synchronize and end instruction). The user-level synchronized thread end module may be operative in response to and/or as a result of the user-level synchronize and end instruction (e.g., in response to one or more instructions or control signals decoded from the instruction) to configure, cause, or otherwise result in the additional processor element stopping performing additional instructions, and waiting at a synchronization barrier until all other additional processor elements (e.g., those which have been initiated by a same user-level fork instruction) to has performed its corresponding user-level synchronize and end instruction and/or has reached the synchronization barrier. In some embodiments, this may include the synchronized thread end module transmitting or otherwise providing a signal 891 to the program counter 883 to freeze or stop the program counter so that additional instructions are not fetched or processed. In some embodiments, this may include the synchronized thread end module transmitting or otherwise providing a signal 892 to an optional synchronization barrier structure 888 to indicate that the additional processor element is performing its user-level synchronize and join instruction and/or has reached the synchronization barrier. As previously mentioned, different ways of implementing the barrier structure are possible, such as, for example, a register with different bits for different ones of the additional processor elements, a counter to increment or decrement, etc.

In some embodiments, if the additional processor element is the last of all the additional processor elements, which have been activated by a given user-level fork instruction, to reach the synchronization barrier, the user-level synchronized thread end module may be operative to transfer control back to the thread on the first processor element after each of the additional processor elements has performed the corresponding user-level synchronize and end instruction. For example, in some embodiments, the synchronized thread end module of the last additional processor element to reach the barrier may optionally transmit or otherwise provide a signal 893 to the first processor element to indicate that all of the additional processor elements have reached the barrier and that the join is to completed and execution of the thread on the first processor element is to resume. In other embodiments, the first processor element may optionally observe the status in the synchronization barrier, or receive a signal from the synchronization barrier, when all of the activated additional processor elements have reached the synchronization barrier.

The additional processor element may have architectural state 884. The architectural state may include the types of architectural state previously mentioned, such as, for example, general-purpose registers, packed data registers, floating point registers, status registers, an instruction pointer, and the like. As shown, in some embodiments, the architectural state may include one or more so-called sticky flags (e.g., sticky error flags) 894. By way of example, these sticky flags may include sticky floating point status or error flags, such as, for example, a divide by zero flag, an invalid operation flag, a denormal flag, and the like. As one specific example, the sticky flags may include sticky floating point error flags in a MXCSR register in an x86 processor. These flags are relatively sticky meaning that once they are set they generally are not cleared until possible error conditions are duly investigated and resolved if appropriate. The sticky flags are contrasted with non-sticky flags like the carry flag, overflow flag, zero flag, and other arithmetic flags.

In some embodiments, the user-level synchronized thread end module, responsive to the user-level sync and end instruction, may be operative to communicate error condition information and/or an indication of one or more error conditions encountered by the additional processor element to the first processor element. In some embodiments, the error condition information may be associated with and/or may include or indicate one or more of the sticky flags 894. Communicating or indicating such sticky flags or error condition information to the first processor element may help to allow the first processor element to analyze the sticky flags or other error condition information, and take appropriate actions where appropriate. This error condition information may be communicated or indicated in different ways in different embodiments. In some embodiments, each of the additional processor elements may communicate a separate set of such information to the first processor element. In other embodiments, a merged or combined set of such information may be communicated to the first processor element. As one example, when each of the additional processor elements performs its synchronize and end instruction it may communicate this error condition information directly to the first processor element. Representatively, the first processor element may assimilate the information into its corresponding architectural registers and then process the error condition information accordingly.

As another example, when each of the additional processor elements performs its synchronize and end instruction, it may signal 897 or otherwise communicate this error condition information to a storage location 885 that is accessible to the additional processor element and the first processor element. Different types of storage locations are suitable for different embodiments. Examples of suitable storage locations include, but are not limited to, one or more registers of the additional processor element, one or more registers of the first processor element, one or more memory locations in a memory shared by the first processor element and the additional processor element, and the like, and combinations thereof. In some embodiments, the storage location may represent one or more memory locations in a user-addressable memory space, which is shared by the first processor element and each of the additional processor elements, and which is used to implement a parallel processing control data structure. In some embodiments, this parallel processing control data structure may be separate from a procedure call stack used by an operating system. In some embodiments, this parallel processing control data structure may be accessible to both the first processor element and each of the additional processor elements, and may be used to pass various different types of control and data desired for the particular implementation between the first processor element and each of the additional processor elements. Alternatively, various other types of storage locations may optionally be used instead.

Either separate sets of this error condition information may be stored in the storage location 885 for each of the additional processor elements, or a single combined or merged set of this error condition information may be maintained and stored in the storage location. For example, the merged or combined set of error condition information may set a given sticky error condition flag if the given sticky error condition flag is set in any of the additional processor elements. In other words, a single set of cumulative error condition information may be maintained representing any error conditions in any of the additional processor elements and this single set of cumulative error condition information may be communicated to the first processor element. These are just a few illustrative examples. Other ways of communicating the error condition information are also contemplated. In some embodiments, the additional processor element responsive to the user-level synchronize and join instruction may also preserve or store results of execution 896 in the storage location 885, such as, for example, in a shared user memory space.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s)

956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
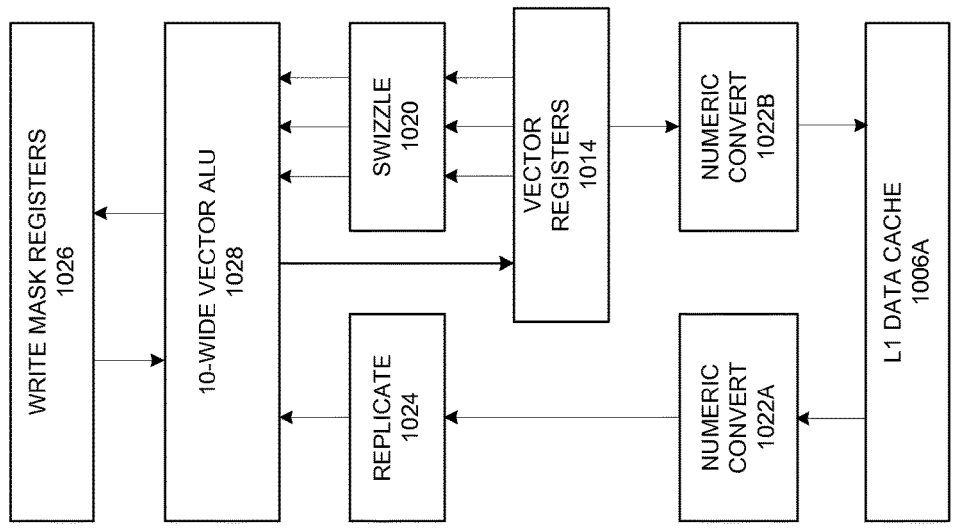
FIG. 10B is a block diagram of an embodiment of an expanded view of part of the processor core of FIG. 10A.
Figure 10A:
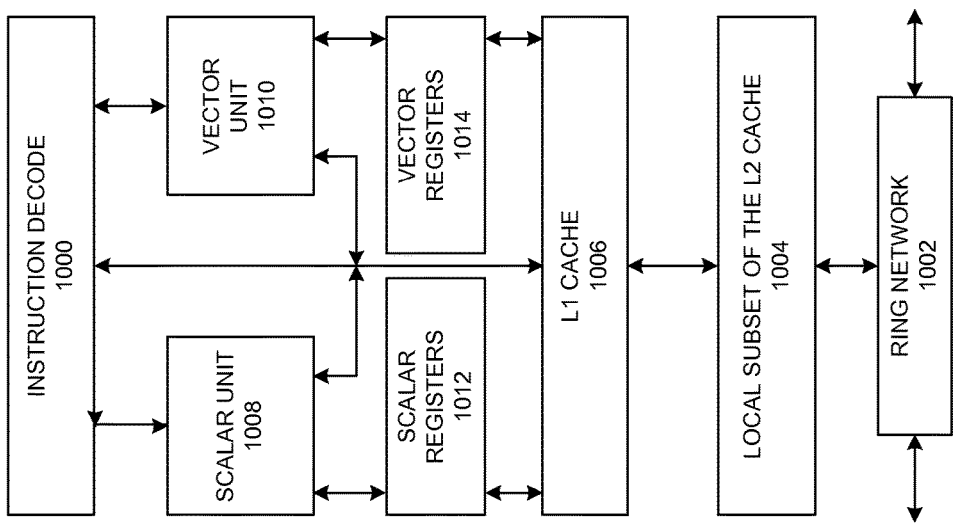
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
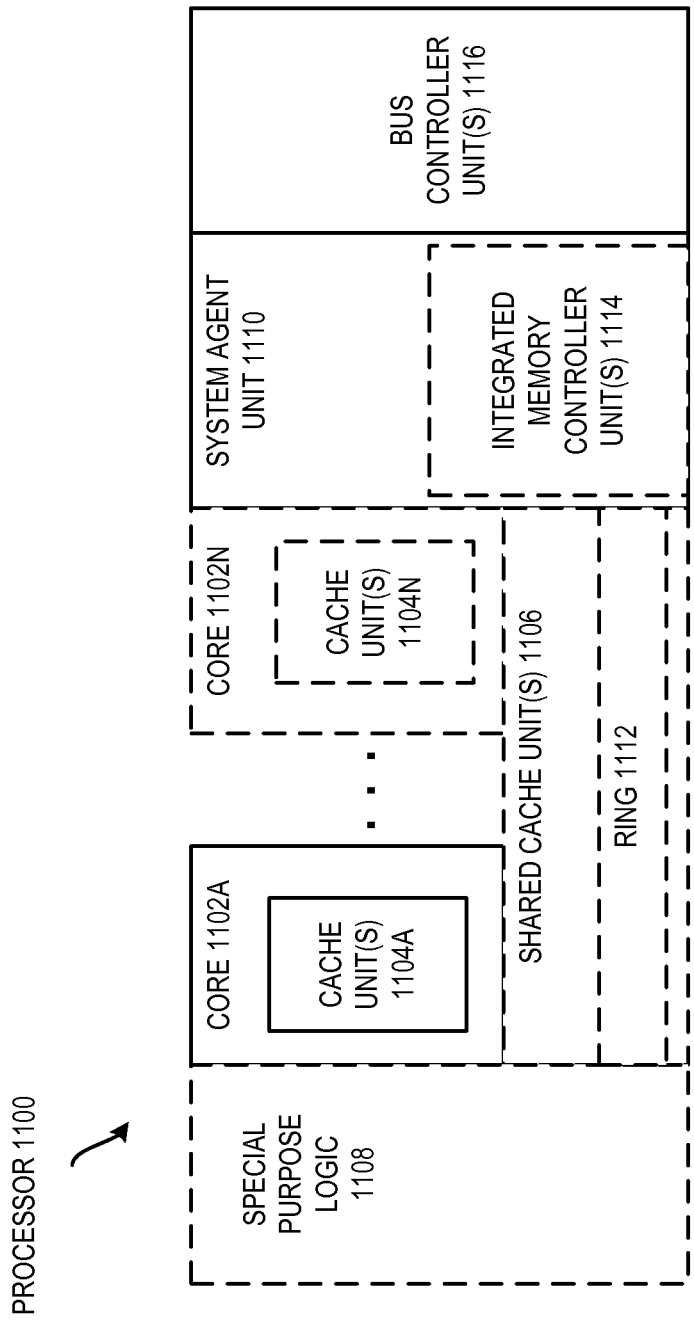
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
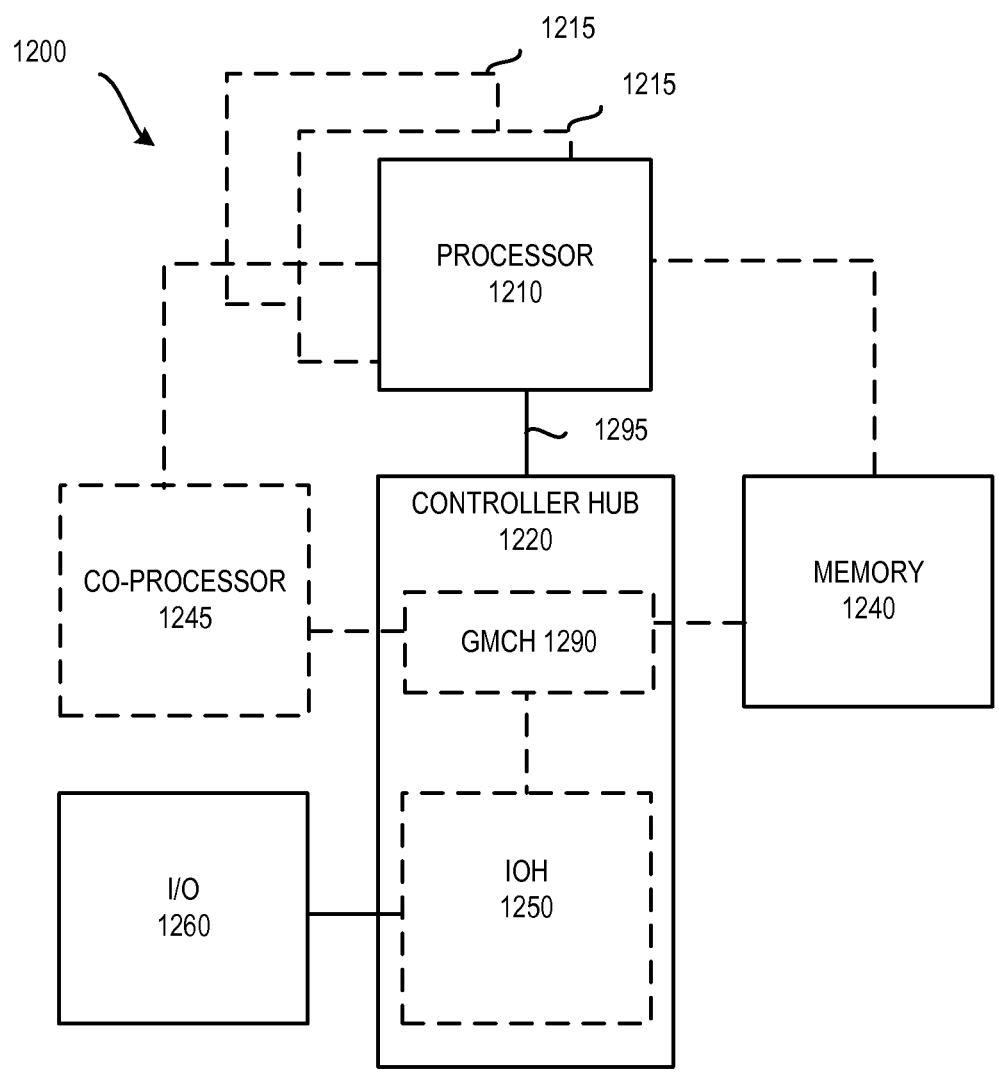
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
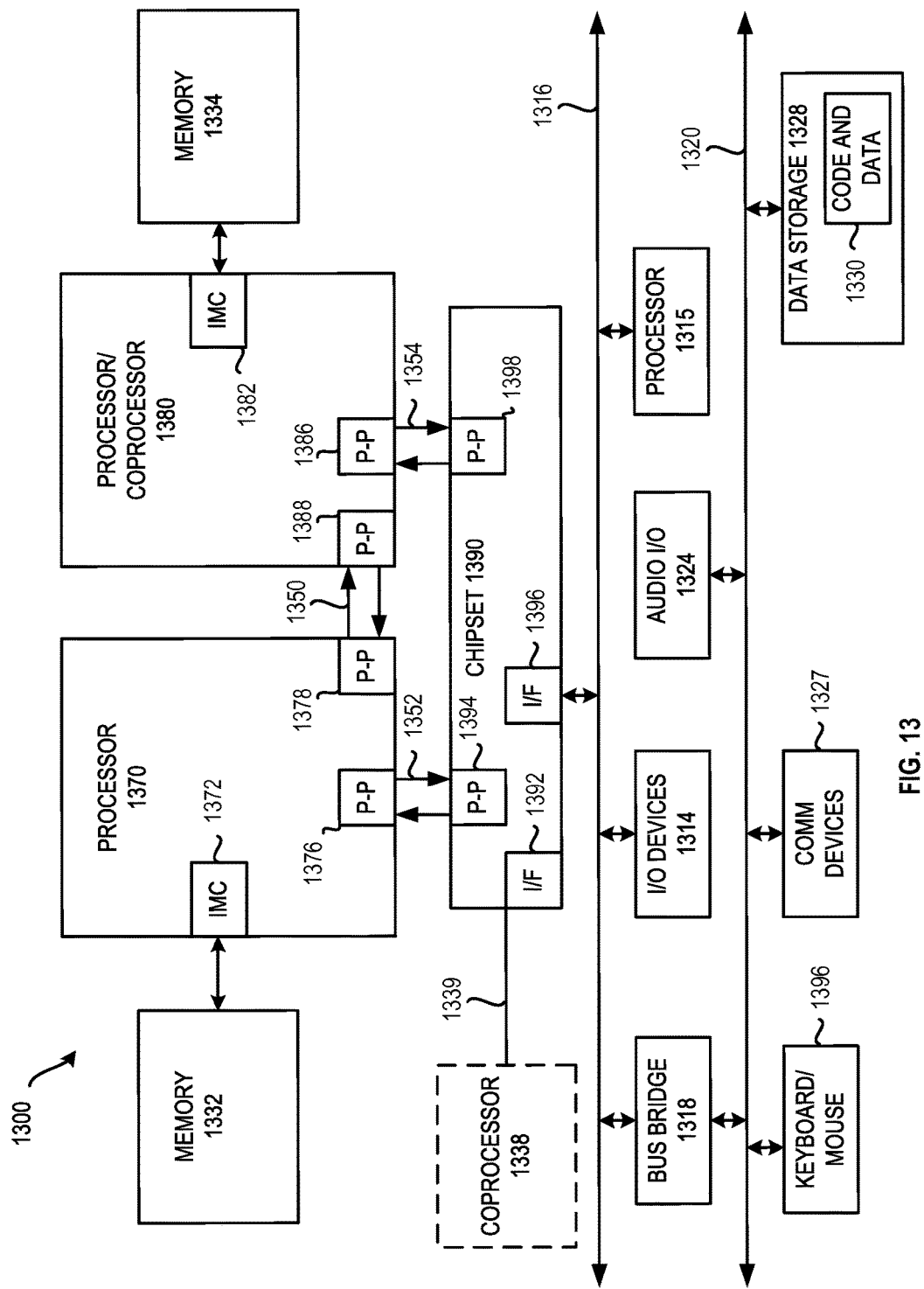
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively.

Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
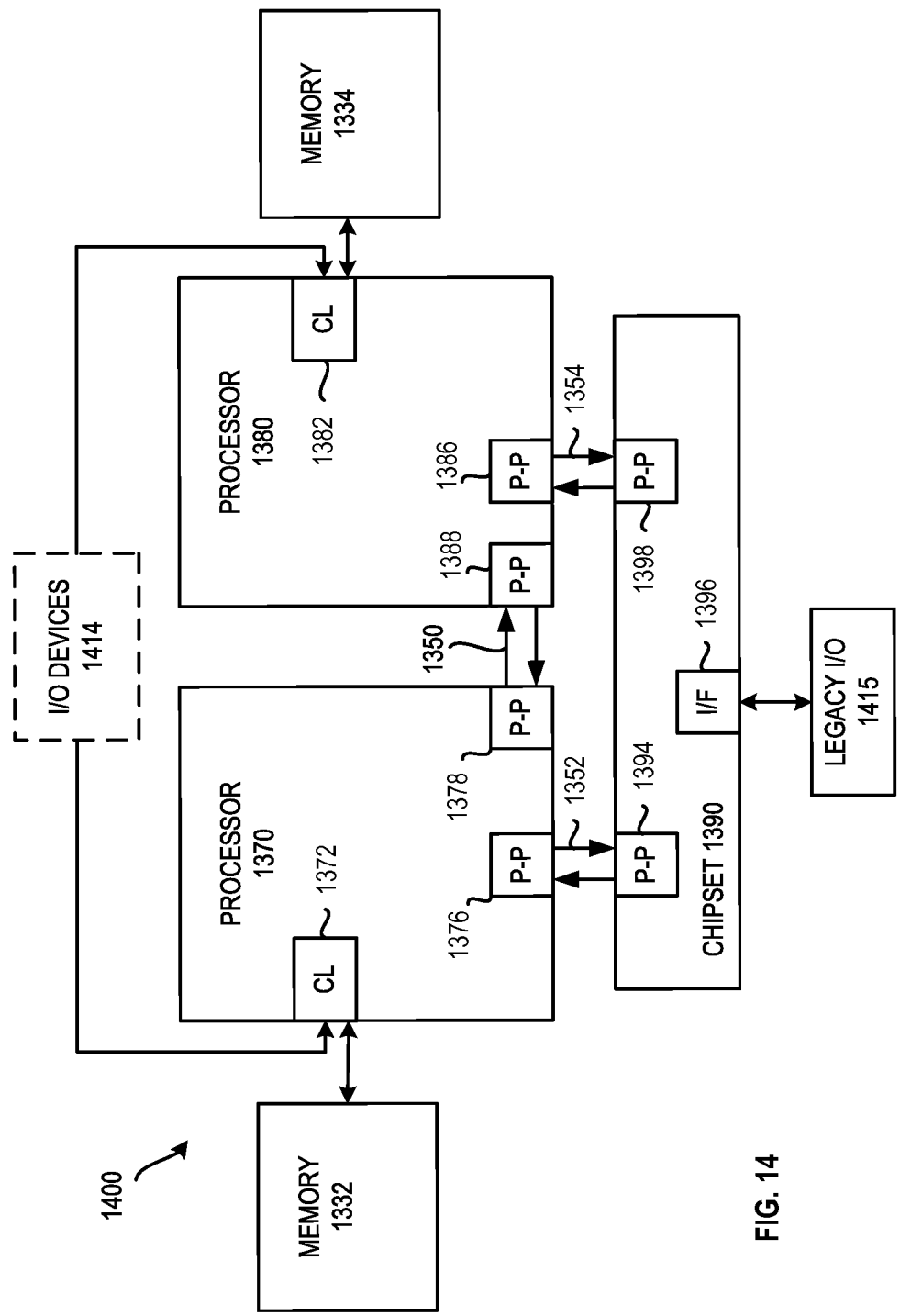
FIG. 14 is a block diagram of a third embodiment of a computer architecture.

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
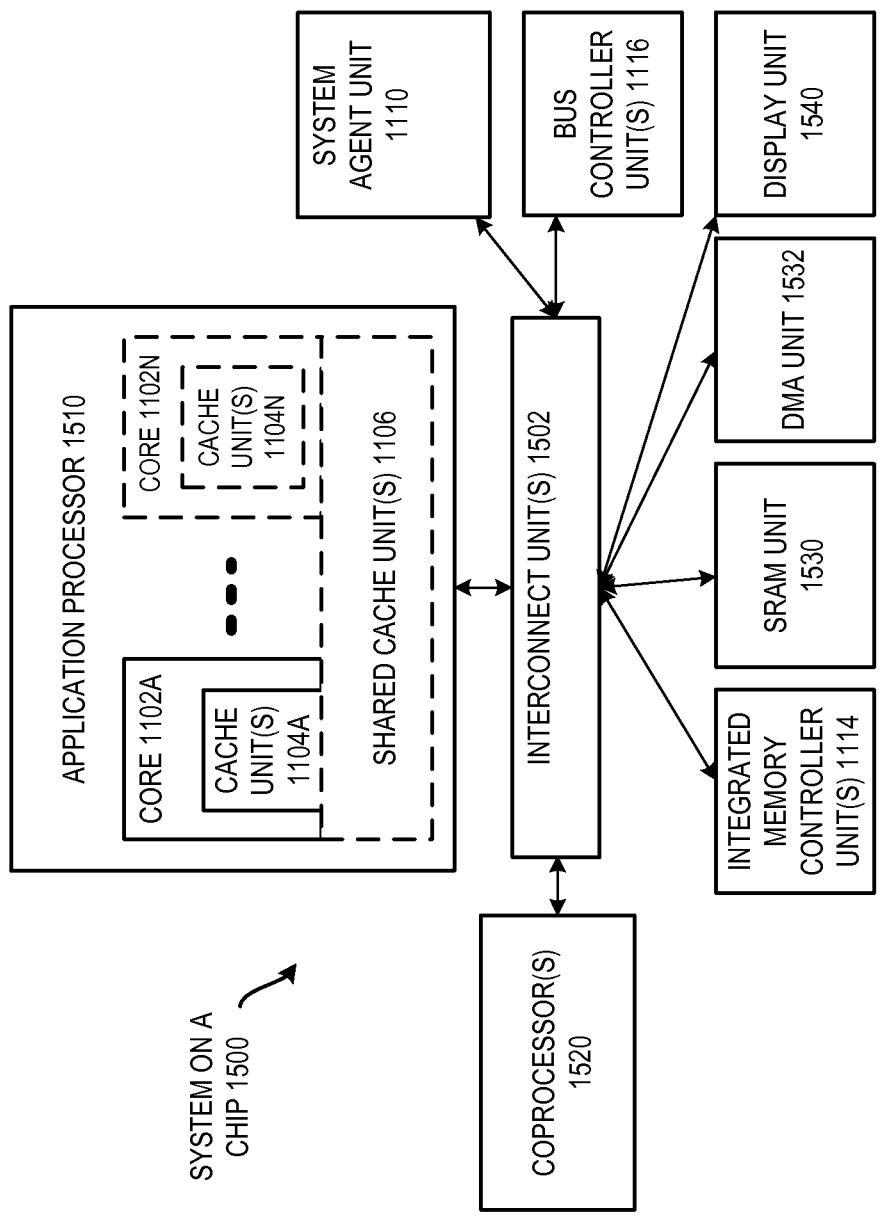
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
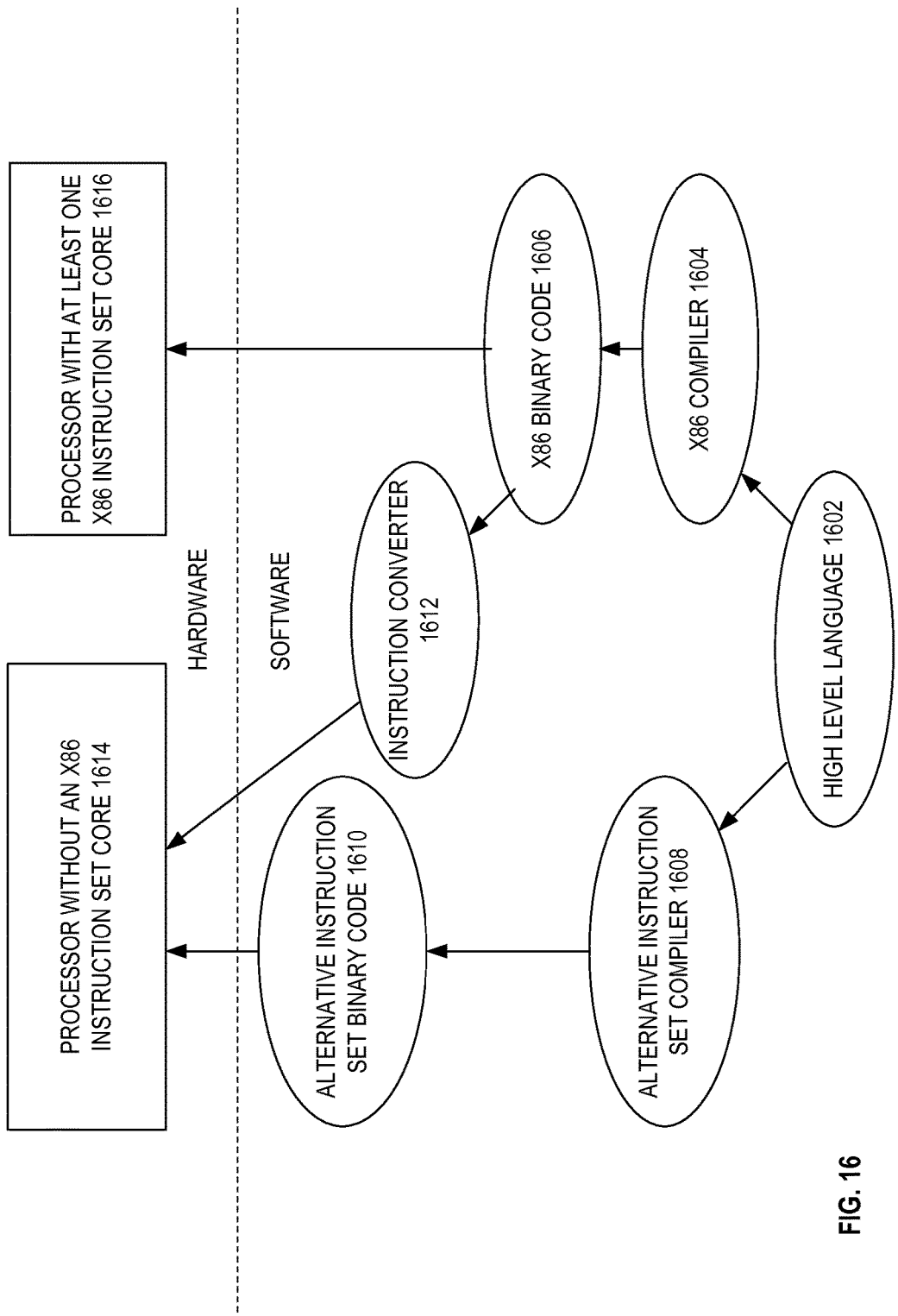
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 2-6 may also optionally apply to any of FIGS. 1, 7, and 8. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 12-15). In some embodiments, the computer system may include an interconnect, a processor coupled with the interconnect, and a dynamic random access memory (DRAM) coupled with the interconnect. Alternatively, instead of DRAM, other types of volatile memory that don't need to be refreshed may be used, or flash memory may be used.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an decode unit may be coupled with a thread scheduler module and/or synchronization module through one or more intervening units, modules, or other components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes a plurality of processor elements, and a first processor element to perform a user-level fork instruction of a software thread. The first processor element includes a decoder to decode the user-level fork instruction. The user-level fork instruction is to indicate at least one instruction address. The first processor element also includes a user-level thread fork module that, in response to the user-level fork instruction being decoded, to configure each of the plurality of processor elements to perform instructions in parallel.

Example 2 includes the processor of Example 1, in which the decoder is to decode the user-level fork instruction which is optionally to indicate a single instruction address, and in which the user-level thread fork module, in response to the user-level fork instruction being decoded, is to store the optional single instruction address in each of a plurality of program counters that each correspond to a different one of the plurality of processor elements.

Example 3 includes the processor of Example 1, in which the decoder is to decode the user-level fork instruction which is to optionally indicate a plurality of different instruction addresses, and in which the user-level thread fork module, in response to the user-level fork instruction being decoded, is optionally to store a different one of the plurality of different instructions addresses in each of a plurality of program counters that each correspond to a different one of the plurality of processor elements.

Example 4 includes the processor of any one of Examples 1 to 3, in which the user-level thread fork module, in response to the user-level fork instruction being decoded, is optionally to provide a copy of an architectural state of the first processor element to each of the plurality of processor elements.

Example 5 includes the processor of Example 4, in which to provide the copy of the architectural state to each of the plurality of processor elements optionally includes to store a copy of the architectural state in each of a plurality of memory locations that are each to correspond to a different one of the plurality of processor elements.

Example 6 includes the processor of any one of Examples 1 to 5, in which the user-level thread fork module, in response to the user-level fork instruction being decoded, is to configure each of the plurality of processor elements to perform the instructions in parallel optionally without intervention from supervisory system software.

Example 7 includes the processor of any one of Examples 1 to 6, in which the user-level thread fork module, in response to the user-level fork instruction being decoded, is optionally to cause the first processor element to stop performing instructions of the software thread, and optionally wait at a synchronization barrier.

Example 8 includes the processor of any one of Examples 1 to 6, in which the user-level thread fork module, in response to the user-level fork instruction being decoded, does optionally not cause the first processor element to stop performing instructions of the software thread.

Example 9 includes the processor of any one of Examples 1 to 8, in which each of the plurality of processor elements is to perform a corresponding user-level synchronize and end instruction, and in which each of the plurality of processor elements includes a decoder to decode the corresponding user-level synchronize and end instruction, and a user-level synchronized thread end module, in response to the corresponding user-level synchronize and end instruction being decoded, to cause the corresponding processor element in which it is included to stop performing additional instructions, wait until each of the plurality of processor elements has performed the corresponding user-level synchronize and end instruction, and transfer control to a second instruction of the software thread that is to be performed on the first processor element, after each of the plurality of processor elements has performed the corresponding user-level synchronize and end instruction.

Example 10 includes the processor of Example 9, in which each user-level synchronized thread end module, in response to the corresponding user-level synchronize and end instruction being decoded, is optionally to communicate an indication of one or more error conditions associated with one or more flags to the first processor element.

Example 11 includes the processor of any one of Examples 1 to 10, in which the first processor element optionally has an instruction set that includes instructions that are also included in an instruction set of each of the plurality of processor elements.

Example 12 includes the processor of any one of Examples 1 to 11, in which the first processor element optionally has a lower average instruction performance latency than each of the plurality of processor elements.

Example 13 includes the processor of any one of Examples 1 to 11, in which the first processor element optionally has a microarchitecture in which instruction execution is more out-of-order than a microarchitecture of each of the plurality of processor elements.

Example 14 includes the processor of any one of Examples 1 to 11, in which the first processor element optionally has a commit unit to commit results of instructions that are to have been executed out-of-order to architectural state in original program order, and in which each of the plurality of processor elements does not have a commit unit.

Example 15 includes the processor of any one of Examples 1 to 11, in which the user-level thread fork module, in response to the user-level fork instruction being decoded, is to configure each of optionally at least twenty of the plurality of processor elements to perform the instructions in parallel, and in which the at least twenty of the plurality of processor elements all share a single decoder.

Example 16 includes the processor of any one of Examples 1 to 11, further including a branch prediction unit to predict branches, an instruction prefetch unit coupled with the branch prediction unit, the instruction prefetch unit to prefetch instructions including the user-level fork instruction, a level 1 (L1) instruction cache coupled with the instruction prefetch unit, the L1 instruction cache to store instructions, an L1 data cache to store data, a level 2 (L2) cache to store data and instructions, an instruction fetch unit coupled with the decode unit, the L1 instruction cache, and the L2 cache, to fetch the user-level fork instruction from one of the L1 instruction cache and the L2 cache, and provide the user-level fork instruction to the decode unit, a register rename unit to rename registers, a scheduler to schedule one or more operations that have been decoded from the user-level fork instruction for execution, and a commit unit.

Example 17 is a method in a processor that includes receiving, at a first processor element, a user-level fork instruction of a software thread. The user-level fork instruction indicates at least one instruction address. The method also includes configuring, with the first processor element, each of a plurality of additional processor elements to perform instructions in parallel, responsive to the user-level fork instruction. Each of the plurality of additional processor elements is to start performing instructions at an instruction address of the at least one instruction address indicated by the user-level fork instruction.

Example 18 includes the method of Example 17, in which receiving includes receiving the user-level fork instruction that indicates a single instruction address, and in which configuring includes storing the single instruction address in each of a plurality of program counters that each correspond to a different one of the plurality of additional processor elements.

Example 19 includes the method of Example 17, in which receiving includes receiving the user-level fork instruction that indicates a plurality of instruction addresses, and in which configuring includes storing each of the plurality of instruction addresses in a different one of a plurality of program counters that each correspond to a different one of the plurality of additional processor elements.

Example 20 includes the method of any one of Examples 17 to 19, in which configuring includes storing a copy of an architectural state of the first processor element for each of the plurality of additional processor elements.

Example 21 includes the method of any one of Examples 17 to 20, in which configuring includes the first processor element configuring each of the plurality of additional processor elements to perform the instructions in parallel without intervention from supervisory system software.

Example 22 includes the method of any one of Examples 17 to 21, further including, the first processor element, responsive to performing the user-level fork instruction stopping performing instructions of the software thread, and waiting at a synchronization barrier.

Example 23 includes the method of any one of Examples 17 to 22, further including, each of the plurality of additional processor elements, responsive to performing a corresponding user-level synchronize and end instruction stopping performing additional instructions, waiting until each of the plurality of additional processor elements has performed the corresponding user-level synchronize and end instruction, and transferring control to a second instruction of the software thread, after each of the plurality of additional processor elements has performed the corresponding user-level synchronize and end instruction.

Example 24 includes the method of Example 23, further including, each of the plurality of additional processor elements, responsive to performing the corresponding user-level synchronize and end instruction, communicating error condition information to the first processor element.

Example 25 includes the method of any one of Examples 17 to 24, further including, each of the plurality of additional processor elements decoding instructions that are included in an instruction set of the first processor element.

Example 26 includes the method of any one of Examples 17 to 25, further including executing instructions out-of-order in the first processor element, and executing instructions in order in each of the plurality of additional processor elements.

Example 27 is a computer system or other system to process instructions including an interconnect, a processor coupled with the interconnect, the processor including a plurality of processor elements and a first processor element to perform a user-level fork instruction of a software thread, the user-level fork instruction to indicate at least one instruction address, the first processor element, in response to the user-level fork instruction, to configure each of the plurality of processor elements to perform instructions in parallel, and a dynamic random access memory (DRAM) coupled with the interconnect, the DRAM storing code including at least one user-level fork instruction.

Example 28 includes the system of Example 27, in which the first processor element has a microarchitecture in which instruction execution is more out-of-order than a microarchitecture of each of the plurality of processor elements, and in which the first processor element in response to the user-level fork instruction being decoded, is to configure each of at least twenty of the plurality of processor elements to perform the instructions in parallel.

Example 29. An article of manufacture including a non-transitory machine-readable storage medium, the non-transitory machine-readable storage medium storing a user-level fork instruction, the user-level fork instruction to indicate at least one instruction address, and the user-level fork instruction if executed by a first processor element of a processor is to cause the first processor element to perform operations including configuring each of a plurality of additional processor elements of the processor to perform instructions in parallel, responsive to the user-level fork instruction, in which each of the plurality of additional processor elements is to start performing instructions at an instruction address of the at least one instruction address indicated by the user-level fork instruction, and in which each of the plurality of additional processor elements has a more in order instruction execution pipeline than an out-of-order instruction execution pipeline of the first processor element.

Example 30 includes the article of manufacture of Example 29, further including a user-level synchronize and end instruction that if executed an additional processor element of the plurality of additional processor elements is to cause the additional processor element to perform operations including stopping performing additional instructions, and waiting at a synchronization barrier until each of the plurality of additional processor elements has reached the synchronization barrier.

Example 31 is a processor or other apparatus to perform or operative to perform the method of any one of Examples 17 to 26.

Example 32 is a processor or other apparatus that includes means for performing the method of any one of Examples 17 to 26.

Example 33 is a processor that includes any combination of modules and/or units and/or logic and/or circuitry and/or means for performing the method of any one of Examples 17 to 26.

Example 34 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 17 to 21.

Example 35 is a computer system or other electronic device including a bus or other interconnect, the processor of any one of Examples 1 to 16 coupled with the interconnect, and one or more components coupled with the interconnect that are selected from an optional dynamic random access memory (DRAM), an optional static RAM, an optional flash memory, an optional graphics controller or chip, an optional video card, an optional wireless communications chip, an optional wireless transceiver, an optional Global System for Mobile Communications (GSM) antenna, an optional coprocessor (e.g., a CISC coprocessor), an optional audio device, an optional audio input device, an optional audio output device, an optional video input device (e.g., a video camera), an optional network interface, an optional communication interface, an optional persistent memory (e.g., an optional phase change memory, memristors, etc.), and combinations thereof.

Example 36 is a processor or other apparatus to perform (e.g., that has components to perform or that is operative to perform) any user-level fork instruction substantially as described herein.

Example 37 is a processor or other apparatus to perform (e.g., that has components to perform or that is operative to perform) any user-level synchronize and end instruction substantially as described herein.

Example 38 is a computer system or other electronic device that includes a processor having a decode unit to decode instructions of a first instruction set. The processor also has one or more execution units. The electronic device also includes a storage device coupled with the processor. The storage device is to store a first instruction, which may be any of the instructions substantially as disclosed herein (e.g., the user-level fork instruction or the user-level synchronize and join instruction), and which is to be of a second instruction set. The storage device is also to store instructions to convert the first instruction into one or more instructions of the first instruction set. The one or more instructions of the first instruction set, when performed by the processor, are to cause the processor to perform operations as specified by the first instruction.

Example 39 is a processor or other apparatus substantially as described herein.

Example 40 is a processor or other apparatus that is operative to perform any method substantially as described herein.

What is claimed is:

1. A processor comprising:
a plurality of processor elements; and
a first processor element to perform a user-level fork instruction of a software thread, the first processor element including:
a decoder to decode the user-level fork instruction, wherein the user-level fork instruction is to indicate at least one instruction address; and
a user-level thread fork module, in response to the user-level fork instruction being decoded, to configure each of the plurality of processor elements to perform instructions in parallel, wherein each of the plurality of processor elements is to perform a corresponding user-level synchronize and end instruction, and wherein each of the plurality of processor elements comprises:
a decoder to decode the corresponding user-level synchronize and end instruction; and
a user-level synchronized thread end module, in response to the corresponding user-level synchronize and end instruction being decoded, to cause the corresponding processor element in which it is included to:
stop performing additional instructions;
wait until each of the plurality of processor elements has performed the corresponding user-level synchronize and end instruction; and
transfer control to a second instruction of the software thread that is to be performed on the first processor element, after each of the plurality of processor elements has performed the corresponding user-level synchronize and end instruction.

2. The processor of claim 1, wherein the decoder is to decode the user-level fork instruction which is to indicate a single instruction address, and wherein the user-level thread fork module, in response to the user-level fork instruction being decoded, is to store the single instruction address in each of a plurality of program counters that each correspond to a different one of the plurality of processor elements.

3. The processor of claim 1, wherein the decoder is to decode the user-level fork instruction which is to indicate a plurality of different instruction addresses, and wherein the user-level thread fork module, in response to the user-level fork instruction being decoded, is to store a different one of the plurality of different instructions addresses in each of a plurality of program counters that each correspond to a different one of the plurality of processor elements.

4. The processor of claim 1, wherein the user-level thread fork module, in response to the user-level fork instruction being decoded, is to provide a copy of an architectural state of the first processor element to each of the plurality of processor elements.

5. The processor of claim 4, wherein to provide the copy of the architectural state to each of the plurality of processor elements comprises to store a copy of the architectural state in each of a plurality of memory locations that are each to correspond to a different one of the plurality of processor elements.

6. The processor of claim 1, wherein the user-level thread fork module, in response to the user-level fork instruction being decoded, is to configure each of the plurality of processor elements to perform the instructions in parallel without intervention from supervisory system software.

7. The processor of claim 1, wherein the user-level thread fork module, in response to the user-level fork instruction being decoded, is to cause the first processor element to:
stop performing instructions of the software thread; and
wait at a synchronization barrier.

8. The processor of claim 1, wherein the user-level thread fork module, in response to the user-level fork instruction being decoded, does not cause the first processor element to stop performing instructions of the software thread.

9. The processor of claim 1, wherein each user-level synchronized thread end module, in response to the corresponding user-level synchronize and end instruction being decoded, is to communicate an indication of one or more error conditions associated with one or more flags to the first processor element.

10. The processor of claim 1, wherein the first processor element has an instruction set that includes instructions that are also included in an instruction set of each of the plurality of processor elements.

11. The processor of claim 1, wherein the first processor element has a lower average instruction performance latency than each of the plurality of processor elements.

12. The processor of claim 1, wherein the first processor element has a microarchitecture in which instruction execution is more out-of-order than a microarchitecture of each of the plurality of processor elements.

13. The processor of claim 1, wherein the first processor element has a commit unit to commit results of instructions that are to have been executed out-of-order to architectural state in original program order, and wherein each of the plurality of processor elements does not have a commit unit.

14. The processor of claim 1, wherein the user-level thread fork module, in response to the user-level fork instruction being decoded, is to configure each of at least twenty of the plurality of processor elements to perform the instructions in parallel.

15. A processor comprising:
a plurality of processor elements;
a first processor element to perform a user-level fork instruction of a software thread;
a branch prediction unit to predict branches;
an instruction prefetch unit coupled with the branch prediction unit, the instruction prefetch unit to prefetch instructions including the user-level fork instruction;
a level 1 (L1) instruction cache coupled with the instruction prefetch unit, the L1 instruction cache to store instructions;
an L1 data cache to store data;
a level 2 (L2) cache to store data and instructions;
an instruction fetch unit coupled with a decode unit, the L1 instruction cache, and the L2 cache, to fetch the user-level fork instruction from one of the L1 instruction cache and the L2 cache, and provide the user-level fork instruction to the decode unit;
the decoder, of the first processor element, to decode the user-level fork instruction, wherein the user-level fork instruction is to indicate at least one instruction address;
a register rename unit to rename registers;
a scheduler to schedule one or more operations that have been decoded from the user-level fork instruction for execution;
a user-level thread fork module, of the first processor element, in response to the user-level fork instruction being decoded, to configure each of the plurality of processor elements to perform instructions in parallel; and
a commit unit.

16. The processor of claim 15, wherein the decoder is to decode the user-level fork instruction which is to indicate a single instruction address, and wherein the user-level thread fork module, in response to the user-level fork instruction being decoded, is to store the single instruction address in each of a plurality of program counters that each correspond to a different one of the plurality of processor elements.

17. The processor of claim 15, wherein the decoder is to decode the user-level fork instruction which is to indicate a plurality of different instruction addresses, and wherein the user-level thread fork module, in response to the user-level fork instruction being decoded, is to store a different one of the plurality of different instructions addresses in each of a plurality of program counters that each correspond to a different one of the plurality of processor elements.

18. The processor of claim 15, wherein the user-level thread fork module, in response to the user-level fork instruction being decoded, is to provide a copy of an architectural state of the first processor element to each of the plurality of processor elements.

19. The processor of claim 18, wherein to provide the copy of the architectural state to each of the plurality of processor elements comprises to store a copy of the architectural state in each of a plurality of memory locations that are each to correspond to a different one of the plurality of processor elements.

20. The processor of claim 15, wherein the user-level thread fork module, in response to the user-level fork instruction being decoded, is to configure each of the plurality of processor elements to perform the instructions in parallel without intervention from supervisory system software.

21. The processor of claim 15, wherein the user-level thread fork module, in response to the user-level fork instruction being decoded, is to cause the first processor element to:
stop performing instructions of the software thread; and
wait at a synchronization barrier.

22. The processor of claim 15, wherein the user-level thread fork module, in response to the user-level fork instruction being decoded, does not cause the first processor element to stop performing instructions of the software thread.

23. The processor of claim 15, wherein each of the plurality of processor elements is to perform a corresponding user-level synchronize and end instruction, and wherein each of the plurality of processor elements comprises:
- a decoder to decode the corresponding user-level synchronize and end instruction; and
- a user-level synchronized thread end module, in response to the corresponding user-level synchronize and end instruction being decoded, to cause the corresponding processor element in which it is included to:
- stop performing additional instructions;
- wait until each of the plurality of processor elements has performed the corresponding user-level synchronize and end instruction; and
- transfer control to a second instruction of the software thread that is to be performed on the first processor element, after each of the plurality of processor elements has performed the corresponding user-level synchronize and end instruction.

24. The processor of claim 15, wherein the first processor element has an instruction set that includes instructions that are also included in an instruction set of each of the plurality of processor elements.

25. The processor of claim 15, wherein the first processor element has a lower average instruction performance latency than each of the plurality of processor elements.

26. The processor of claim 15, wherein the first processor element has a microarchitecture in which instruction execution is more out-of-order than a microarchitecture of each of the plurality of processor elements.

27. The processor of claim 15, wherein the first processor element has a commit unit to commit results of instructions that are to have been executed out-of-order to architectural state in original program order, and wherein each of the plurality of processor elements does not have a commit unit.

28. The processor of claim 15, wherein the user-level thread fork module, in response to the user-level fork instruction being decoded, is to configure each of at least twenty of the plurality of processor elements to perform the instructions in parallel, and wherein the at least twenty of the plurality of processor elements all share a single decoder.

* * * * *